United States Patent
Chaplin et al.

(10) Patent No.: US 10,364,169 B2
(45) Date of Patent: Jul. 30, 2019

(54) ULTRAFILTRATION TIO$_2$ MAGNÉLI PHASE REACTIVE ELECTROCHEMICAL MEMBRANES

(71) Applicant: The Board of Trustees of the University of Illinois, Urbana, IL (US)

(72) Inventors: Brian Chaplin, Chicago, IL (US); Yun Guo, Chicago, IL (US); Yin Jing, Chicago, IL (US); Sasmita Nayak, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 158 days.

(21) Appl. No.: 15/365,252

(22) Filed: Nov. 30, 2016

(65) Prior Publication Data

US 2017/0152163 A1     Jun. 1, 2017

Related U.S. Application Data

(60) Provisional application No. 62/261,048, filed on Nov. 30, 2015.

(51) Int. Cl.
| | |
|---|---|
| *C02F 1/46* | (2006.01) |
| *B01D 69/02* | (2006.01) |
| *B01D 69/10* | (2006.01) |
| *B01D 69/14* | (2006.01) |
| *C02F 1/469* | (2006.01) |
| *C02F 101/16* | (2006.01) |
| *C02F 1/44* | (2006.01) |
| *B01D 71/02* | (2006.01) |

(52) U.S. Cl.
CPC .............. *C02F 1/469* (2013.01); *B01D 69/02* (2013.01); *B01D 69/10* (2013.01); *B01D 69/148* (2013.01); *B01D 71/024* (2013.01); *B01D 2325/26* (2013.01); *C02F 1/444* (2013.01); *C02F 2101/163* (2013.01); *C02F 2201/4613* (2013.01); *C02F 2201/46115* (2013.01); *C02F 2303/04* (2013.01); *C02F 2303/22* (2013.01); *C02F 2305/023* (2013.01)

(58) Field of Classification Search
CPC ...................... C02F 1/469; C02F 1/444; C02F 2201/46115; C02F 2201/4613; C02F 2303/04; C02F 2303/22; B01D 69/02; B01D 69/10; B01D 69/148; B01D 71/024; B01D 232/26
USPC ......................................................... 205/746
See application file for complete search history.

(56) References Cited

U.S. PATENT DOCUMENTS

| | | | | |
|---|---|---|---|---|
| 2010/0044243 | A1* | 2/2010 | Cardarelli | ................. C25B 1/26 205/564 |
| 2012/0292196 | A1* | 11/2012 | Albrecht | .................. C25B 1/00 205/351 |

OTHER PUBLICATIONS

Zaky et al. "Mechanism of p-Substituted Phenol Oxidation at a Ti4O7 Reactive Electrochemical Membrane", Environmental Science & Technology (2014), 48, 5857-5867. (Year: 2014).*
Zaky et al. "Porous Substoichiometric TiO2 Anodes as Reactive Electrochemical Membranes for Water Treatment", Environmental Science & Technology (2013), 47(12), 6554-6563, (Year: 2013).*
Zaky et al. "Mechanism of p-Substituted Phenol Oxidation at a T4O7 Reactive Electrochemical Membrane", Environmental Science & Technology (2014), 48(12), 5857-5867. (Year: 2014).*
Amr M. Zaky and Brian P. Chaplin, "Mechanism of p-Substituted Phenol Oxidation at a Ti4O7 Reactive Electrochemical Membrane," Env. Sci. & Tech., 48, 5857-67 (2014).
L. Guo et al., "Bacteria inactivation at a sub-stoichiometric titanium dioxide reactive electrochemical membrane," Journal of Hazardous Materials, 319, 137-146 (2016).
A.M. Zaky et al., "Porous Substoichiometric TiO2 Anodes as Reactive Electrochemical Membranes for Water Treatment," J. Env. Sci. & Tech., 42, 6554-63 (2013).
L. Guo et al., "Development and Characterization of Ultrafiltration TiO2 Magneli Phase Reactive Electrochemical Membranes," J. Env. Sci. & Tech., 50, 1428-36 (2016).
P. Geng, "Magneli Ti4O7 modified ceramicmembraneforelectrically-assisted filtrationwithantifoulingproperty," Journal of Membrane Science, 498, 302-14 (2016).
P.C.S. Hayfield, "Development of a New Material—Monolithic Ti4O7 Ebonex(R) Ceramic," R. Soc. Chem. (Pub). (2002).

\* cited by examiner

Primary Examiner — Michael Bernshteyn
(74) Attorney, Agent, or Firm — McDonnell Boehnen Hulbert & Berghoff LLP

(57) ABSTRACT

The disclosure generally relates to reactive electrochemical membranes (REMs); and in particular, to asymmetric reactive electrochemical membranes to be used for aqueous separations and membrane fouling regeneration.

20 Claims, 12 Drawing Sheets

Figure 8, continued
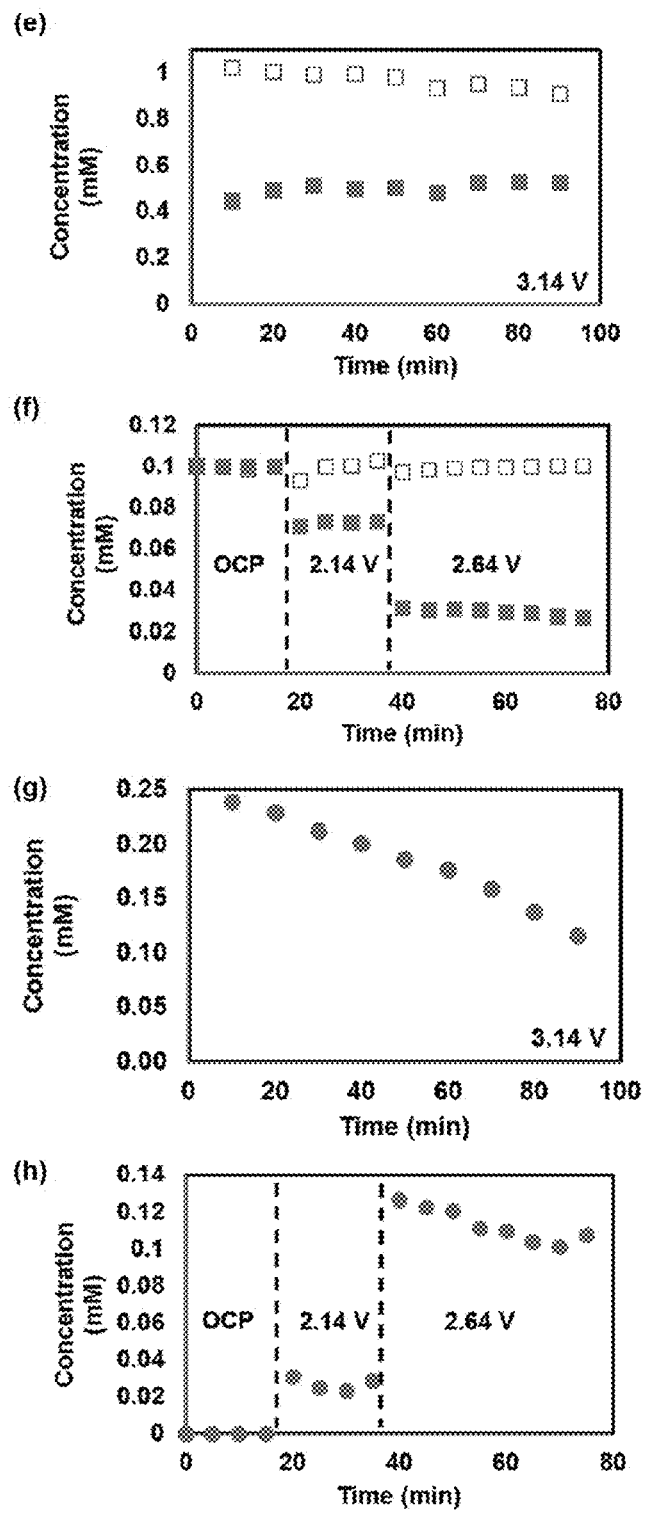

ULTRAFILTRATION TIO$_2$ MAGNÉLI PHASE REACTIVE ELECTROCHEMICAL MEMBRANES

CROSS-REFERENCE TO RELATED APPLICATIONS

This application claims the benefit of priority of U.S. Provisional Patent Application No. 62/261,048, filed Nov. 30, 2015, which is hereby incorporated herein by reference in its entirety.

STATEMENT OF GOVERNMENT INTEREST

The disclosure generally relates to reactive electrochemical membranes (REMs); and in particular, to reactive electrochemical membranes to be used for aqueous separations and membrane fouling regeneration.

BACKGROUND OF THE DISCLOSURE

1. Field of the Invention

The disclosure generally relates to reactive electrochemical membranes (REMs); and in particular, to reactive electrochemical membranes to be used for aqueous separations and membrane fouling regeneration.

2. Background

Oxidation and reduction reactions are important classes of chemical reactions that are often utilized in water treatment. One important example is the electrochemical advanced oxidation process (EAOP), which is the process by which water is oxidized on an anode surface to form hydroxyl radicals. These free radicals may react with a wide range of recalcitrant organic and inorganic compounds often at diffusion-controlled rates. EAOP is one of several technologies that is used for water treatment along with membrane separations.

A reactive electrochemical membrane (REM) is a technology that imparts electrochemical reactivity to a membrane surface. When polarized as either an anode or cathode the REM can be used for simultaneous EAOP and physical separation and/or simultaneous electrochemical reduction and physical separation; electrostatic rejection of ions; and electrochemical cleaning of membrane fouling. Magnéli phase titanium oxide (Ti$_n$O$_{2n-1}$, n=4 to 10) ceramic materials have been utilized for REM fabrication. Reaction rates of solutes were limited by convection to the REM surface, due to the fast radial diffusion of compounds in the micron-sized REM pores. The high reactivity of these materials cannot be fully realized because the previous REM pore structure is not tailored for water treatment. As a result, a high-pressure drop across the membrane develops, which makes the REM unsuitable for water treatment applications.

SUMMARY OF THE DISCLOSURE

Commercially available tubular Ti$_n$O$_{2n-1}$ monolithic electrodes (Ebonex®) were previously utilized as REMs for the oxidation of several organic compounds at high current efficiencies. These reaction rates were limited by convection to the REM, due to the fast radial diffusion of compounds in the micron-sized REM pores. These structures, however, were not suitable for water treatment due to a high-pressure drop across the membrane and, thus, low pressure-normalized permeate fluxes (e.g., 50-70 L m$^{-2}$ hr$^{-1}$ bar$^{-1}$ (LMH bar$^{-1}$)). The inventors have found that an asymmetric REM of the disclosure, having an active layer and a support layer with different pore sizes, can integrate physical separation with electrochemical reactivity into a single technology for use in water purification, without a large pressure drop across the membrane.

Thus, one aspect of the disclosure provides reactive electrochemical membranes (REMs) comprising:
- a support layer having a pore diameter size of about 1 µm to about 10 µm; and
- an active layer disposed adjacent to and in contact with the support layer, and having a pore diameter size of less than about 1 µm, wherein the median pore diameter of the support layer is at least 50% bigger than the median pore diameter of the active layer, and wherein the support layer and the active layer independently comprise at least about 90 wt % oxides of titanium, and wherein the oxides of titanium comprise at least about 80 wt % of one or more of Magnéli-phase titanium oxides of the formula Ti$_n$O$_{2n-1}$, wherein n is an integer 4, 5, or 6.

One aspect of the disclosure provides methods of preparing the electrochemical membranes comprising heating a TiO$_2$ membrane under H$_2$ atmosphere to a temperature of about 800 to about 1500° C.

Another aspect of the disclosure provides methods of purification and filtration of water comprising
- (a) providing a reactor comprising a voltage source having a first terminal and a second terminal, a counter electrode being connected to the first terminal, and the reactive electrochemical membrane of claim 1 being connected to the second terminal;
- (b) passing contaminated water through the reactive electrochemical membrane such that the contaminated water is in contact with the counter electrode while applying a voltage between the counter electrode and the reactive electrochemical membrane using the voltage source to remove contaminants; and
- (c) removing purified and filtered water from the reactor.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
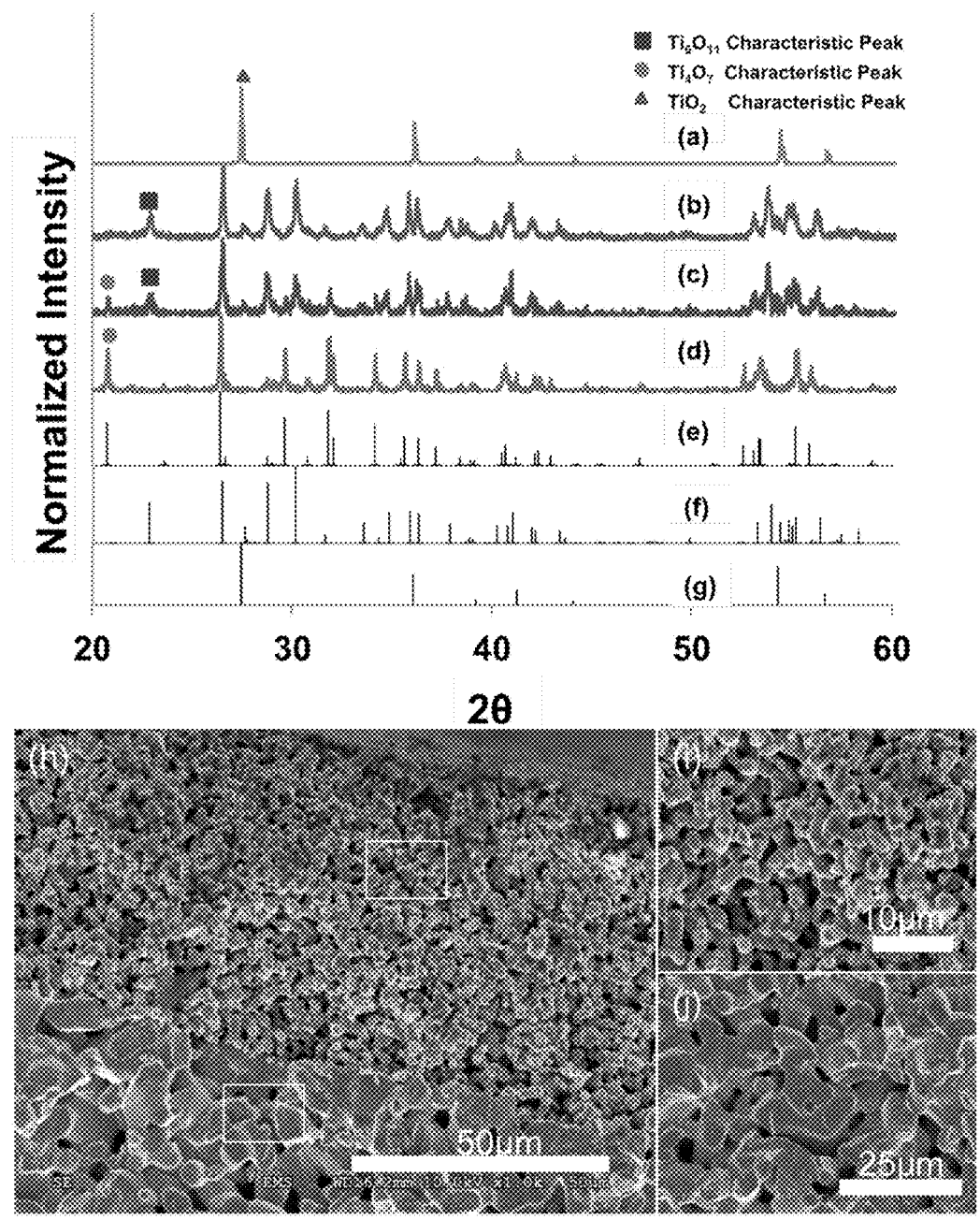
FIG. 1 illustrates X-ray diffraction (XRD) data for: (a) Precursor TiO$_2$ membrane, (b) REM-1, (c) REM-2, (d) REM-3, (e) Ti$_4$O$_7$ standard, (f) Ti$_6$O$_{11}$ standard, and (g) TiO$_2$ standard. Scanning electron microscopy (SEM) images: (h) cross-section of REM-3 showing a top active layer and underlying support; (i) active layer (top white box in (h)); and (j) support layer (bottom white box in (h)).
Figure 2:
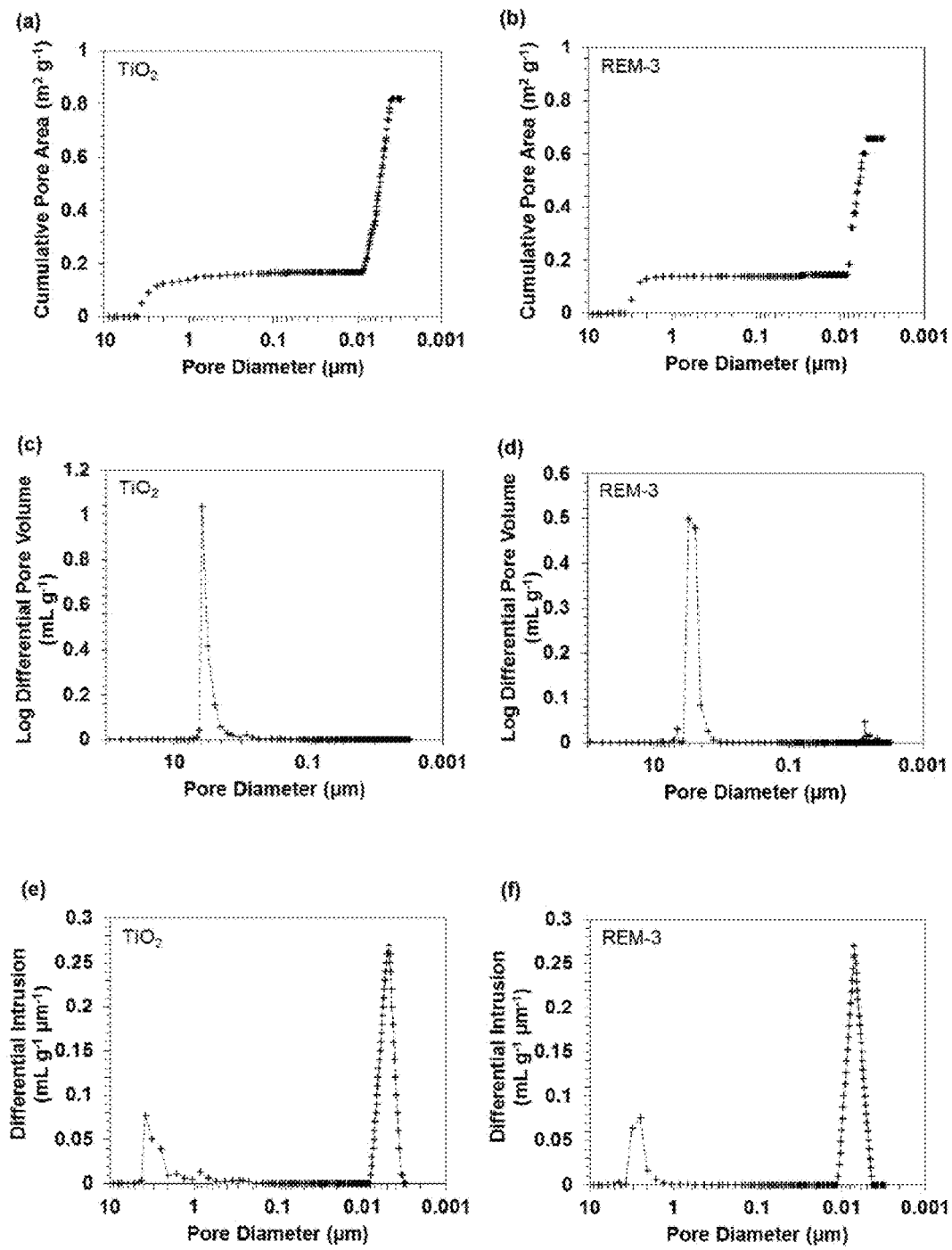
FIG. 2 shows (a) Hg porosimetry analysis of cumulative pore area for a precursor TiO$_2$ membrane (b) Hg porosimetry analysis of cumulative pore area for REM-3, (c) log differential pore volume data for the precursor TiO$_2$ membrane, (d) log differential pore volume data for REM-3, (e) differential intrusion for the precursor TiO$_2$ and (f) differential intrusion for REM-3.

Before the disclosed methods are described, it is to be understood that the aspects described herein are not limited to specific embodiments, or compositions, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "contacting" includes the physical contact of at least one substance to another substance.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the catalyst material).

In view of the present disclosure, the methods and active materials described herein can be configured by the person of ordinary skill in the art to meet the desired need. In general, the disclosed materials, methods, and apparati provide improvements in water purification and filtration. For example, in certain aspect, the REMs of the disclosure integrate physical separation with electrochemical reactivity into a single technology for use in water purification, without a large pressure drop across the membrane. When used as an anode, the REM combines two water treatment technologies: membrane filtration (physical separation) and electrochemical advanced oxidation process (EAOP), in a single device. When used as a cathode, the REM couples electrochemical reduction with membrane filtration. The REM can be used in water treatment to simultaneously filter the water and electrochemically degrade organic pollutants and inactivate bacteria and viruses. This may decrease the footprint and complexity of water treatment. It also may reduce irreversible membrane fouling during operation through periodic offline anodic or cathodic electrochemical regeneration treatments, thereby increasing membrane life and reducing maintenance costs.

The commercially available tubular $Ti_nO_{2n-1}$ monolithic electrodes, marketed under the trade name Ebonex®, have a relatively uniform porous structure. There have been reports that the Ebonex® electrodes have a bimodal pore distribution, with 10 nm pores on the surface and micron-sized pores throughout the volume of the porous structure. However, 10 nm pores disposed on the surface of the Ebonex® material are not flow-through pores; rather these pores are associated with surface roughness and are 'dead end' pores that do not allow significant water transport. Accordingly, the Ebonex® material, while porous, suffers from a very high pressure drop when water is forced through it. In addition, Ebonex® electrodes are also comprised of a range of oxide phases (e.g., $Ti_4O_7$, $Ti_5O_9$, $Ti_6O_{11}$, $Ti_9O_{17}$). While there have been certain statements that Ebonex® electrodes contain primarily $Ti_4O_7$ (Hayfield, P. C. S. Development of a New Material Monolithic $Ti_4O_7$ Ebonex Ceramic; Royal Society of Chemistry: Cambridge, U.K., 2002), it was determined more recently that Ebonex® electrodes did not in fact contain detectable concentrations of $Ti_4O_7$ and were instead comprised primarily of $Ti_9O_{17}$ and $TiO_2$ (Guo et al., Bacteria inactivation at a sub-stoichiometric titanium dioxide reactive electrochemical membrane. *Journal of Hazardous Materials* 2016, 319, 137-146, which is hereby incorporated by reference herein in its entirety for all purposes).

In addition, in other aspects, the reactive electrochemical membranes of the disclosure can be used as electrostatic barriers for ion separation. Although electro dialysis (ED) is similar in function, the technology is fundamentally different from REMs. ED membranes possess high ionic conductivity but are electrically insulating. Polymeric ED membranes suffer from high production costs, are susceptibility to organic and mineral fouling, and are not chemically robust, which increase the capital costs and operation and maintenance costs for ED water treatment. The REMs of the disclosure comprise chemically resistant Magnéli phase $Ti_nO_{2n-1}$ material and, surprisingly, fouling and scaling can be eliminated by either reverse polarity treatment or chemical treatment (acid and base) without adverse effects to the membrane.

Figure 12:
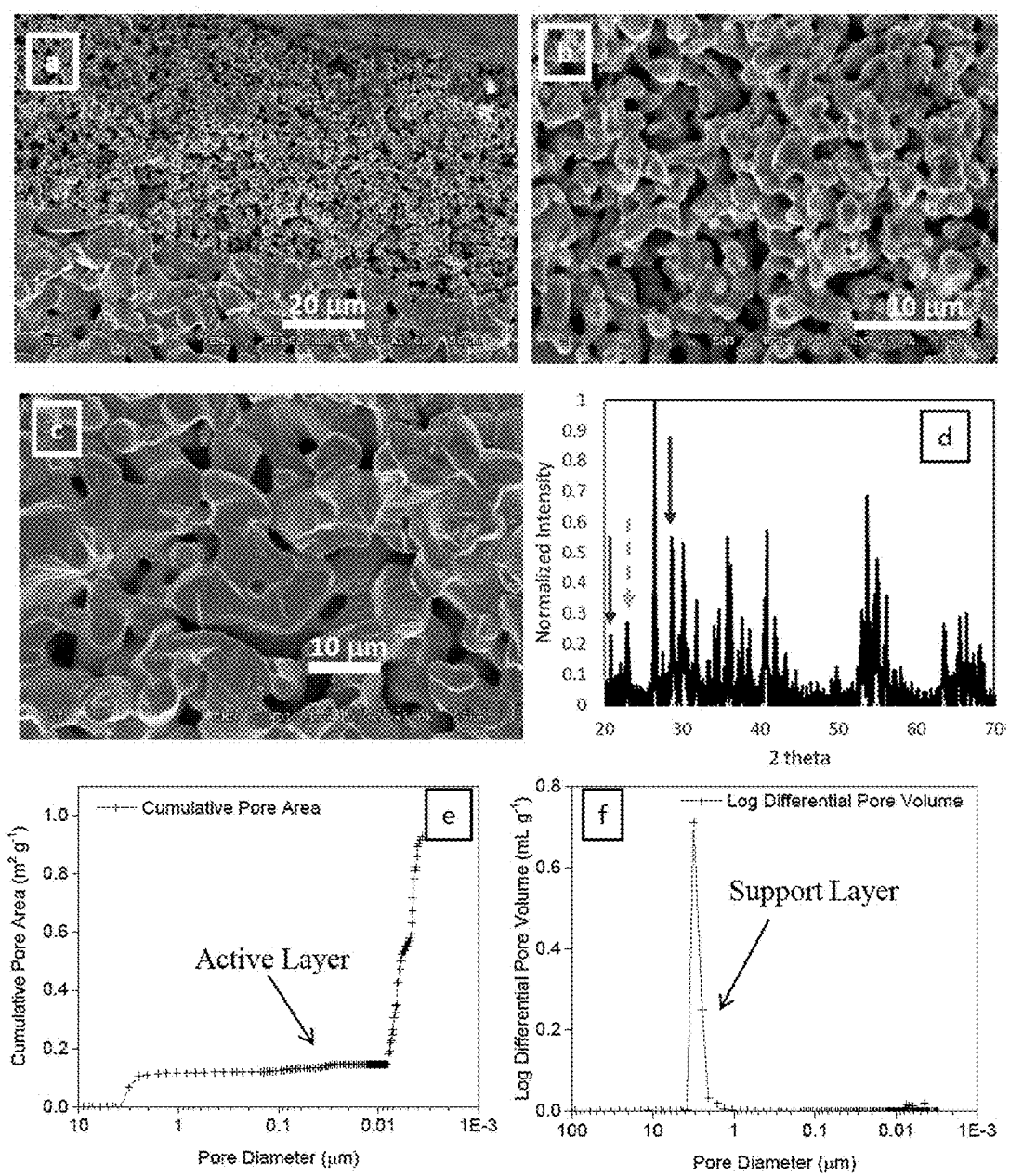
FIG. 12 shows SEM of REM-4, (a) overall SEM image, (b) SEM image of the active layer, (c) SEM image of the support layer; (d) XRD of substoichiometric $TiO_2$ membrane with solid and dash arrows representing standard characteristic peaks of $Ti_4O_7$ and $Ti_6O_{11}$, respectively; (e) results of Hg intrusion porosimetry analysis of cumulative pore area, and (f) log differential intrusion pore volume (solid line represents piece-wise linear interpolation).

The reactive electrochemical membranes of the disclosure comprise a support layer and an active layer disposed adjacent to and in contact with the support layer. For example, non-limiting embodiments of the reactive electrochemical membranes of the disclosure are described with respect to Example 1 (FIG. 1), and in Example 2 (FIG. 12).

In certain embodiments of the reactive electrochemical membranes as otherwise described herein, the support layer has larger median pore sizes than the active layer as measured by Hg porosimetry. In particular embodiments of the disclosure the support layer has a median pore diameter size of about 1 µm to about 10 µm (as measured by Hg porosimetry). In other embodiments, the active layer has a median pore diameter size of less than about 1 µm (as measured by Hg porosimetry). The median pore diameter of the support layer can be, for example, at least 50% bigger than, or at least twice, or at least five times, or at least ten times, or at least twenty times, or at least fifty times, or even at least hundred times bigger than the median pore diameter of the active layer.

In certain embodiments of the reactive electrochemical membranes as otherwise described herein, the support layer in the reactive electrochemical membrane of the disclosure has a median pore diameter size of about 1 µm to about 8 µm, or about 1 µm to about 7 µm, or about 1 µm to about 5 or about 1 µm to about 4 or about 1 µm to about 3 or about 1 to about 2 or about 2 µm to about 8 or about 2 µm to about 7 or about 2 µm to about 5 or about 2 µm to about 4 or about 2 µm to about 3 or about 2.5 µm to about 3.5 or about 2.5 µm to about 3.25 µm (as measured by Hg porosimetry).

The small pore sizes of the active layer allow for increased reactivity as the small pores lead to faster radial mass transport rates (i.e., from solution to the electrode surface). Thus, in certain embodiments of the reactive electrochemical membranes as otherwise described herein, the active layer in the reactive electrochemical membrane of the disclosure has a median pore diameter size of about 5 nm to about 1 or about 5 nm to about 500 nm, or about 5 nm to about 200 nm, or about 5 nm to about 100 nm, or about 5 nm to about 50 nm, or about 10 nm to about 1 or about 10 nm to about 500 nm, or about 10 nm to about 200 nm, or about 10 nm to about 100 nm, or about 10 nm to about 50 nm, or about 20 nm to about 1 or about 20 nm to about 500 nm, or about 20 nm to about 200 nm, or about 20 nm to about 100 nm, or about 20 nm to about 50 nm, or about 30 nm to about 1 or about 30 nm to about 500 nm, or about 30 nm to about 200 nm, or about 30 nm to about 100 nm, or about 30 nm to about 50 nm, or about 50 nm to about 1 or about 50 nm to about 500 nm, or about 50 nm to about 200 nm, or about 50 nm to about 100 nm (as measured by Hg porosimetry). In certain embodiments of the reactive electrochemical membranes as otherwise described herein, the active layer in the reactive electrochemical membrane of the disclosure has a median pore diameter size of about 1 nm to about 1 or about 1 nm to about 500 nm, or about 1 nm to about 200 nm, or about 1 nm to about 100 nm, or about 1 nm to about 50 nm, or about 1 nm to about 10 nm, or about 5 nm to about 1 or about 5 nm to about 500 nm, or about 5 nm to about 200 nm, or about 5 nm to about 100 nm, or about 5 nm to about 50 nm (as measured by Hg porosimetry). And unlike the "dead end" surface pores of the Ebonex® material, the pores of this active layer are substantially interconnected, so that they allow for significant fluid transport therethrough.

In certain embodiments of the reactive electrochemical membranes as otherwise described herein, the median pore diameter of the support layer is about 2 to about 500 times the median pore diameter size of the active layer. For example, in certain embodiments of the reactive electrochemical membranes as otherwise described herein, the median pore diameter of the support layer is about 2 to about 200 times, or about 2 to about 100 times, or about 2 to about 50 times, or about 5 to about 400 times, or about 5 to about 300 times, or about 5 to about 250 times, or about 5 to about 200 times, or about 5 to about 150 times, or about 5 to about 100 times or about 5 to about 50 times, or about 10 to about 500 times, or about 10 to about 400 times, or about 10 to about 300 times, or about 10 to about 250 times, or about 10 to about 200 times, or about 10 to about 150 times, or about 10 to about 100 times the median pore diameter size of the active layer. Here, too, the pores of the support later are substantially interconnected, such that they allow for significant fluid transport therethrough.

In certain embodiments of the reactive electrochemical membranes as otherwise described herein, the support layer has a thickness that is larger than the thickness of the active layer. For example, in certain embodiments, the thickness of the support layer is about 1.5 to about 100 times the thickness of active layer. In certain embodiments, the thickness of the support layer is about 2 to about 100 times, or about 2 to about 50 times, or about 2 to about 45 times, or about 2 to about 40 times, or about 2 to about 30 times, or about 3 to about 100 times, or about 3 to about 50 times, or about 3 to about 45 times, or about 3 to about 40 times the thickness of the active layer.

The larger pore sizes of the relatively thicker support layer allow for minimal pressure drop across the membrane. Accordingly, the support layer can be made relatively thick to provide mechanical strength without severely impacting pressure drop across the membrane. Thus, in certain embodiments of the reactive electrochemical membranes as otherwise described herein the support layer has a thickness of about 50 µm to about 5 mm. For example, in certain embodiments of the reactive electrochemical membranes as otherwise described herein, the support layer of the reactive electrochemical membrane has a thickness of at least about 100 µm, or at least about 200 µm, or at least about 300 µm, or even at least about 1 mm, e.g., or about 100 µm to about 5 mm, about 100 µm to about 4.5 mm, or about 100 µm to about 4 mm, or about 100 µm to about 3.5 mm, or about 100 µm to about 3 mm, or about 100 µm to about 2.5 mm, or about 100 µm to about 2 mm, or about 150 µm to about 4.5 mm, or about 150 µm to about 4 mm, or about 150 µm to about 3.5 mm, or about 150 µm to about 3 mm, or about 150 µm to about 2.5 mm, or about 150 µm to about 2 mm, or about 200 µm to about 5 mm, or about 200 µm to about 4 mm, or about 200 µm to about 3.5 mm, or about 200 µm to about 3 mm, or about 200 µm to about 2.5 mm, or about 500 µm to about 5 mm, or about 500 µm to about 4 mm, or about 500 µm to about 3.5 mm, or about 500 µm to about 3 mm, or about 500 µm to about 2.5 mm, or about 1 mm to about 5 mm, or about 1 mm to about 4 mm, or about 1 mm to about 3.5 mm, or about 1 mm to about 3 mm, or about 1 mm to about 2.5 mm, or about 2 mm to about 5 mm, or about 2 mm to about 4 mm, or about 2 mm to about 3.5 mm, or about 2 mm to about 3 mm, or about 2 mm to about 2.5 mm, or about 2.3 mm to about 2.7 mm, or about 2.4 mm to about 2.6 mm, or about 2.5 mm.

The active layer can be made relatively thinner, as it is physically supported by the support layer. The person of ordinary skill in the art will select a thickness for the active layer that provides a desired degree of reactivity and a desired degree of pressure drop for the reactive electrochemical membrane, in view of, for example, the pore size of the active layer. In certain embodiments of the reactive electrochemical membranes as otherwise described herein, the active layer has a thickness of about 10 to about 100 µm. For example, in certain embodiments of the reactive electrochemical membranes as otherwise described herein, the active layer in the reactive electrochemical membrane of the disclosure has a thickness about 10 µm to about 90 µm, or about 10 µm to about 80 µm, or about 10 µm to about 70 µm, or about 10 µm to about 60 µm, or about 20 µm to about 100 µm, or about 20 µm to about 90 µm, or about 20 µm to about 80 µm, or about 20 µm to about 70 µm, or about 20 µm to about 60 µm, or about 30 µm to about 100 µm, or about 30 µm to about 90 µm, or about 30 µm to about 80 µm, or about 30 µm to about 70 µm, or about 30 µm to about 60 µm, or about 50 µm to about 100 µm, or about 50 µm to about 90 µm, or about 50 µm to about 80 µm, or about 50 µm to about 70 µm, or about 50 µm to about 60 µm, or about 45 µm to about 85 µm, or about 45 µm to about 80 µm, or about 45 µm to about 75 µm, or about 55 µm to about 75 µm, or about 60 µm, or about 70 µm.

In the reactive electrochemical membranes of the disclosure the active layer has a volume and the support layer has a volume. In certain embodiments of the reactive electrochemical membranes as otherwise described herein, the volume of the support layer is greater than the volume of the active layer by at least about 40 times, or by at least about 50 times, or by at least about 60 times, or by at least about 40 to about 60 times, or by at least about 50 to about 60 times.

The reactive electrochemical membranes of the disclosure comprise a support layer and an active layer wherein the support layer and the active layer independently include at least about 80 wt % oxides of titanium, and wherein the oxides of titanium comprise at least about 80 wt % of one or more of Magnéli-phase $Ti_nO_{2n-1}$, wherein n is an integer 4, 5, or 6.

In certain embodiments of the reactive electrochemical membranes as otherwise described herein, each of the support layer and the active layer independently includes oxides of titanium in an amount of at least about 85 wt %, at least about 90 wt %, or at least about 95 wt %, or at least about 96 wt %, or at least about 97 wt %, or at least about 98 wt %, or at least about 99 wt %, or at least about 99.5 wt %, or at least about 99.8 wt %, or at least about 99.9 wt % of the total composition of the reactive electrochemical membrane. In certain embodiments of the reactive electrochemical membranes as otherwise described herein, each of the support layer and the active layer independently includes 100 wt % oxides of titanium (e.g., the support layer and the active layer consist of oxides of titanium).

In certain embodiments of the reactive electrochemical membranes as otherwise described herein, the oxides of titanium comprise one or more of Magnéli-phase $Ti_nO_{2n-1}$ in an amount of at least about 85 wt %, or at least about 90 wt %, or at least about 93 wt %, or at least about 95 wt %, or at least about 96 wt %, or at least about 97 wt %, or at least about 98 wt %, or at least about 98.5 wt %, or at least about 99 wt %, or at least about 99.5 wt %, or at least about 99.8 wt %, or at least about 99.9 wt % of the total composition of reactive electrochemical membrane. In certain embodiments of the reactive electrochemical membranes as otherwise described herein, the support layer and the active layer independently comprise 100 wt % of one or more of Magnéli-phase $Ti_nO_{2n-1}$ (e.g., the support layer and the active layer consist of Magnéli-phase $Ti_nO_{2n-1}$). In certain embodiments of the reactive electrochemical membranes as otherwise described herein, the support layer and the active layer independently consist essentially of one or more of Magnéli-phase $Ti_nO_{2n-1}$.

In certain embodiments of the reactive electrochemical membranes as otherwise described herein, the Magnéli-phase $Ti_nO_{2n-1}$ is wherein n is 4. For example, in certain embodiments of the reactive electrochemical membranes as otherwise described herein, each of the support layer and the active layer includes, or consists essentially of, or consists of $Ti_4O_7$.

In certain embodiments of the reactive electrochemical membranes as otherwise described herein, the Magnéli-phase $Ti_nO_{2n-1}$ is wherein n is 6. For example, in certain embodiments of the reactive electrochemical membranes as otherwise described herein, each of the support layer and the active layer includes, or consists essentially of, or consists of $Ti_6O_{11}$.

In certain embodiments of the reactive electrochemical membranes as otherwise described herein, the Magnéli-phase $Ti_nO_{2n-1}$ is wherein n is 4 and 6. For example, in certain embodiments of the reactive electrochemical membranes as otherwise described herein, each of the support layer and the active layer includes, or consists essentially of, or consists of a mixture of $Ti_4O_7$ and $Ti_6O_{11}$.

The reactive electrochemical membranes of the disclosure can have, in certain embodiments as otherwise described herein, a roughness factor of at least about 300 (determined based on inner surface area). In certain embodiments of the reactive electrochemical membranes as otherwise described herein, the roughness factor is at least about 1000, or at least about 2000, or at least about 3000, or about 300 to about 10000, or about 300 to about 6000, or about 300 to about 4000, or about 1000 to about 10000, or about 1000 to about 6000, or about 1000 to about 4000, or about 2000 to about 10000, or about 2000 to about 6000, or about 2000 to about 4000, or about 3000 to about 10000, or about 3000 to about 6000.

The presence of a multi-layer structure and the substantially interconnected pore structures in the reactive electrochemical membranes of the disclosure allows for faster reactivity and lower pressure drop across the membrane.

For example, the reactive electrochemical membranes of the disclosure may exhibit high liquid flux and minimal pressure drop. Certain embodiments of the reactive electrochemical membranes as otherwise described herein have a pressure-normalized permeate membrane flux for deionized water between about 100 and about 8000 L m$^{-2}$ hr$^{-1}$ bar$^{-1}$ (LMH bar$^{-1}$), as measured at a temperature of 21° C., a cross flow rate of 50 L h$^{-1}$, and trans-membrane pressure of 68.9 kPa (10 psi). In certain embodiments of the reactive electrochemical membranes as otherwise described herein, the pressure-normalized permeate membrane flux for deionized water between about 200 and about 8000 LMH bar$^{-1}$, or 1000 and about 8000 LMH bar$^{-1}$, or 3000 and about 8000 LMH bar$^{-1}$, or 3500 and about 8000 LMH bar$^{-1}$, or about 3700 and about 8000 LMH bar$^{-1}$, or about 4000 and about 8000 LMH bar$^{-1}$, or about 4500 and about 8000 LMH bar$^{-1}$, or about 4700 and about 8000 LMH bar$^{-1}$, or about 5000 and about 8000 LMH bar$^{-1}$, or about 5500 and about 8000 LMH bar$^{-1}$, or about 6000 and about 8000 LMH bar$^{-1}$, or about 6500 and about 8000 LMH bar$^{-1}$, or about 3000 and about 7500 LMH bar$^{-1}$, or about 3500 and about 7500 LMH bar$^{-1}$, or about 3700 and about 7500 LMH bar$^{-1}$, or about 4000 and about 7500 LMH bar$^{-1}$, or about 4500 and about 7500 LMH bar$^{-1}$, or about 4700 and about 7500 LMH bar$^{-1}$, or about 5000 and about 7500 LMH bar$^-$, or about 5500 and about 7500 LMH bar$^{-1}$, or about 6000 and about 7500 LMH bar$^{-1}$, or about 6500 and about 7500 LMH bar$^{-1}$, or 100 and about 8000 LMH bar$^{-1}$, or 200 and about 7000 LMH bar$^-$, or 1000 and about 7000 LMH bar$^{-1}$, or about 3000 and about 7000 LMH bar$^-$, or about 3500 and about 7000 LMH bar$^{-1}$, or about 3700 and about 7000 LMH bar$^-$, or about 4000 and about 7000 LMH bar$^{-1}$, or about 4500 and about 7000 LMH bar$^{-1}$, or about 4700 and about 7000 LMH bar$^{-1}$, or about 5000 and about 7000 LMH bar$^{-1}$, or about 5500 and about 7000 LMH bar$^{-1}$, or about 6000 and about 7000 LMH bar$^{-1}$, or about 6500 and about 7000 LMH bar$^-$, measured at a temperature of 21° C., a cross flow rate of 50 L h$^{-1}$, and trans-membrane pressure of 68.9 kPa. In an exemplary embodiment, 50 kDa molecular weight cutoff (MWCO) Ti$_4$O$_7$ membranes exhibits membrane fluxes of approximately about 3000 L m$^{-2}$ hr$^{-1}$ bar$^{-1}$ (LMH bar$^{-1}$). This may result in an extremely high convection-enhanced rate constant for Fe(CN)$_6^{4-}$ (or other compounds) oxidation/reduction. The convection-enhanced rate constant may be about or greater then 1.4×10$^{-4}$ m s$^{-1}$, which approaches the kinetic limit of the Fe(CN)$_6^{4-}$ species.

In contrast, the commercially available Ebonex® electrodes were not suitable for water treatment due to a high-pressure drop across the membrane and, thus, low pressure-normalized permeate fluxes. Ebonex® electrodes showed pressure-normalized permeate fluxes of 50-70 LMH bar$^{-1}$ as measured by Zaky and Chaplin (Porous Substoichiometric TiO$_2$ Anodes as Reactive Electrochemical Membranes for Water Treatment. *Environmental Science & Technology* 2013, 47, (12), 6554-6563; Mechanism of p-Substituted Phenol Oxidation at a Ti$_4$O$_7$ Reactive Electrochemical Membrane. *Environ. Sci. Technol.* 2014, 48, (10), 5857-5867), and also reported by Guo et al. (Development and Characterization of Ultrafiltration TiO$_2$ Magnéli Phase Reactive Electrochemical Membranes. *Environmental Science & Technology* 2016, 50, (3), 1428-1436). These references are hereby incorporated by reference herein in their entirety for all purposes.

In the reactive electrochemical membranes of the disclosure the active layer has an electroactive surface area and the support layer has an electroactive surface area. In certain embodiments of the reactive electrochemical membranes as otherwise described herein, the electroactive surface area of the active layer is at least about 20%, or at least about 25%, or at least about 28%, or at least about 30% of the combined electroactive surface area of the active layer and the support layer.

In the reactive electrochemical membranes of the disclosure the active layer has a surface area. In certain embodiments of the reactive electrochemical membranes as otherwise described herein, at least about 2%, or at least about 3%, or at least about 4%, or at least about 5% of the combined surface area of the active layer and the support layer is electroactive.

The disclosure also provides methods of preparing the reactive electrochemical membrane. Such methods comprise heating a TiO$_2$ membrane under H$_2$ atmosphere to a temperature of about 800 to about 1500° C. In certain embodiments of the methods of preparing the reactive electrochemical membranes as otherwise described herein, heating of the TiO$_2$ membrane is at the temperature of about 800 to about 1500° C., or about 900 to about 1500° C., or about 1000 to about 1500° C., or about 800 to about 1200° C., or about 800 to about 1100° C., or about 800 to about 1000° C., or about 900 to about 1200° C., or about 1000 to about 1100° C., or about 1050 to about 1080° C. The reactive electrochemical membranes may be synthesized from porous TiO$_2$ ultrafiltration or microfiltration membranes or from TiO$_2$ or Ti$_n$O$_{2n-1}$ powders. In the methods of preparing the reactive electrochemical membranes, H$_2$ atmosphere may be maintained at a pressure of about 0.5 atm to about 1.5 atm, or about 0.5 atm to about 1 atm, or about 1 atm to about 1.5 atm, or about 1 atm. In certain embodiments of the methods of preparing the reactive electrochemical membranes as otherwise described herein, the reactive electrochemical membrane prepared according to the methods of the disclosure may be further configured as an electrochemical cell.

The REMs of the disclosure exhibit unique chemical and electrical properties that make it suitable for use as electrodes for electrochemical oxidation and reduction and electrostatic rejection of water contaminants. Thus, one aspect of the disclosure provides methods of purification and filtration of water comprising (a) providing a reactor comprising a voltage source having a first terminal and a second terminal, a counter electrode being connected to the first terminal, and the reactive electrochemical membrane of claim 1 being connected to the second terminal; (b) passing contaminated water through the reactive electrochemical membrane such that the contaminated water is in contact with the counter electrode while applying a voltage between the counter electrode and the reactive electrochemical membrane using the voltage source to remove contaminants; and (c) removing purified and filtered water from the reactor. Contaminants may include bacterial pathogens (e.g., *Escherichia coli*), viral pathogens, and organic and inorganic compounds. The electrode may generate hydroxyl radicals and participate in direct electron transfer reactions. Water may flow through the electrode pores, where the hydroxyl radicals and/or direct electron transfer reactions inactivate bacteria and other microorganisms, and oxidize or reduce organic/inorganic compounds. The REM may act as cathode for reduction reactions or electrostatic rejection of anions. In one embodiment, one or more of contaminants is oxyanions (such as $ClO_4^-$, $NO_3^-$, or the like). In certain embodiments of the methods of using the reactive electrochemical membranes as otherwise described herein, the reactive electrochemical membrane is configured as an anode, and the counter electrode is configured as a cathode. In certain embodiments of the methods of using the reactive electrochemical membranes as otherwise described herein, the reactive electrochemical membrane is configured as a cathode, and the counter electrode is configured as an anode. In certain embodiments of the methods of using the reactive electrochemical membranes as otherwise described herein, the reactive electrochemical membrane is configured independently as a cathode and as an anode. In certain embodiments of the methods of using the reactive electrochemical membranes as otherwise described herein, the reactor optionally comprises a reference electrode.

The process of preparing the reactive electrochemical membrane and the reactive electrochemical membrane configuration itself minimizes or alleviates the pressure drop across the membrane. In certain embodiments of the methods of using the reactive electrochemical membranes as otherwise described herein, the pressure drop across the reactive electrochemical membrane during passing of the contaminated water is less than about 3 bar, or less than about 2 bar, or less than about 1.5 bar, or about 0.5 bar to about 3 bar, or about 0.5 bar to about 2 bar, or about 0.5 bar to about 1.5 bar, or about 0.5 bar to about 1 bar, or about 1 bar to about 2 bar, or about 1 bar to about 1.5 bar, or about 0.75 bar to about 1.25 bar, or about 0.8 bar to about 1.2 bar, or about 1 bar. Further, the REMs of the disclosure have a three-dimensional sub-micron porous structure and flow-through operation that increases mass transport of contaminants to the reactive electrochemical membrane pore walls by an order of magnitude relative to flow-by mode of operation. In certain embodiments of the methods of using the reactive electrochemical membranes as otherwise described herein, the contaminant mass transport coefficient to the reactive electrochemical membrane pore walls are at a rate of at least about $1 \times 10^{-5}$ m s$^{-1}$, or at least about $1 \times 10^{-4}$ m s$^{-1}$. This, in turn, may reduce the required electrode size by an order of magnitude.

The REM may be used as either an anode or cathode to electrochemically regenerate the fouled REM surface. In certain embodiments, the methods of purification and filtration of water further comprise submitting the reactive electrochemical membrane to anodic or cathodic electrochemical regeneration after removing the purified and filtered water from the reactor. In certain embodiments, the regeneration is by cathodic polarization or anodic polarization.

EXAMPLES

Materials and Methods

Sodium nitrate ($NaNO_3$), sodium perchlorate ($NaClO_4$), oxalic acid (OA), potassium ferrocyanide ($K_4Fe(CN)_6$), potassium ferricyanide ($K_3Fe(CN)_6$), coumarin (COU), 7-hydroxycoumarin (7-HC), terephthalic acid (TA), and 2-hydroxyterephthalic acid (HTA) were obtained from Sigma-Aldrich. All solutions were prepared using Barnstead NANOpure water (18.2 MΩ cm).

Characterization

The membranes were characterized by X-ray diffraction (XRD, Siemens D-5000) with a Cu X-ray tube (40 kV and 25 mA), and scans were collected with DataScan software (MDI, v. 4.3.355, 2005) at a 0.02 degree step size and a 1 s dwell time.

Scanning electron microscopy (SEM, Hitachi S-3000N) was used to characterize the structure of REM at 10 kV from 1 to 3 k magnification. Conductivity measurements were performed using electrochemical impedance spectroscopy (EIS) with amplitude of ±4 mV and a frequency range of 0.1 to $3 \times 10^4$ Hz. Conductivity (a) was calculated from the membrane cross-sectional area (A=0.589 cm$^2$) and length (x=10 cm), using the following equation:

$$\sigma = \frac{x}{R_m A} \quad (1)$$

where $R_m$ is the measured membrane resistance determined by EIS.

Figure 13:
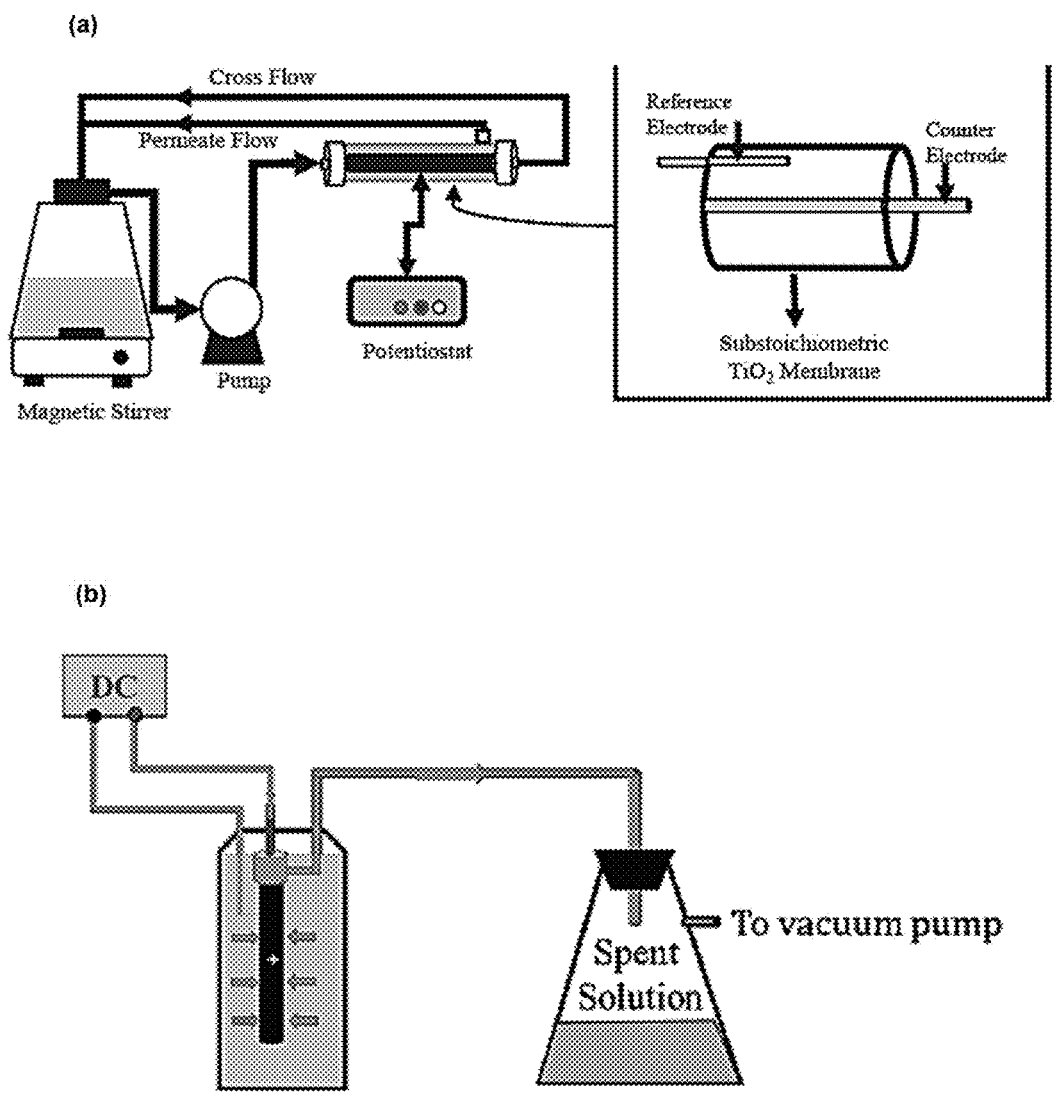
FIG. 13 illustrates the methods of the disclosure. (a) setup for EIS measurement, and (b) set up for chemical free electrochemical regeneration (CFER) in backwash mode.

Filtration experiments were conducted using a cross-flow filtration setup. FIG. 13a illustrates a three-electrode set up. The REM was used as working electrode, and a 1.6 mm diameter 316 stainless steel rod was used as counter electrode. A leak-free Ag/AgCl reference electrode (Warner Instruments, LF-100) was placed ~0.85 mm from the inner REM surface. Potentials were applied and monitored using a Gamry Reference 600 potentialstat/galvanostat.

EIS Measurement of Electroactive Surface Area

Electroactive surface area of the reactive electrochemical membrane was determined by EIS measurements at the OCP (~160 mV), amplitude of ±4 mV, and a frequency range of 0.01 to $3 \times 10^4$ Hz. Experiments were performing in cross-flow filtration mode with a 100 mM $NaClO_4$ supporting electrolyte and permeate flux of 803 LMH. A transmission line model (TLM) previously developed was used to fit the EIS data.

The TLM is able to decouple the impedances at i distinct membrane locations (i=outer membrane surface, active layer pores, or support layer pores) at the membrane electrolyte interface. EIS data is used to characterize the electro-active surface area at each location, through calculation of the double layer capacitance ($C_{dl}$) using the following equation:

$$Cdl, i = \left( \frac{Y_{o,i}}{[r_s^{-1} + R_{ct,i}^{-1}]^{1-\alpha}} \right)^{\frac{1}{\beta}} \quad (2)$$

where $r_s$ is the solution resistance (ohm), $R_{ct,i}$ is the charge transfer resistance (ohm) of location i; $Y_{o,i}$ is the capacitance (F), and β (dimensionless) is related to an exponential factor that represents the angle of rotation of a purely capacitive line on the complex plane plots. A value of 60 μF cm$^{-2}$ was taken as an estimate of the $C_{dl}$ for a metal oxide and was used to calculate the electro-active surface area of REM-3.

For EIS measurements, a silver wire was used as a pseudo reference electrode, due to the high impedance of the Ag/AgCl reference. All potentials were corrected for solution resistance, which was calculated by EIS measurements, and potentials are reported versus the standard hydrogen electrode (SHE). Reynolds numbers for membrane cross-flow ranged between 312 and 1247 (laminar).

Reaction Rate Characterization.

The intrinsic surface area normalized kinetic rate constant (k) for $Fe(CN)_6^{4-}$ oxidation was determined by linear sweep voltammetry (LSV) in filtration mode with a 103 kPa trans-membrane pressure ($\Delta P$). The solution contained 5 mM $Fe(CN)_6^{4-}$ in a 100 mM $KH_2PO_4$ background electrolyte. Increased scan rate (v) during LSV will cause a shift in the oxidation peak current ($i_p$) to higher anodic potentials, and k can be determined from a plot of $i_p$ versus peak potential ($E_p$). The following equation is used for an irreversible electron transfer:

$$\ln (i_p) = -\alpha f(E_p - E^0) + \ln (0.227\, FAC_b k) \quad (3)$$

where $C_b$ is the bulk concentration (mol m$^{-3}$); $E^0$ is the formal potential; $\alpha = 0.5$ is the transfer coefficient; f=F/RT; and other parameters have their usual meanings. A value for $E^0$ was determined by measurement of the open circuit potential (OCP) of the solution.

The observed rate constant ($k_{obs}$ (m s$^{-1}$)) for $Fe(CN)_6^{4-}$ oxidation at the REM was determined using the limiting current approach, and $k_{obs}$ was calculated using equation (4).

$$k_{obs} = \frac{I_{lim}}{zFA_iC_b} \quad (4)$$

where $A_i$ is the internal REM surface (m$^2$); $I_{lim}$ is the limiting current (A); and z=1 is the number of electrons transferred. Experiments were conducted with a solution of 5 mM $Fe(CN)_6^{4-}$ and 5 mM $Fe(CN)_6^{3-}$ in a 100 mM $KH_2PO_4$ supporting electrolyte, and $I_{lim}$ was determined by scanning the anodic potential at v=100 mV s$^{-1}$, starting at the OCP. The permeate flux (J) was controlled by varying $\Delta P$ (0 to 103 kPa). An additional measurement of $I_{lim}$ at REM-3 was performed at a v=10 mV s$^{-1}$ and in an electrolyte consisting of 5 mM $Fe(CN)_6^{4-}$, 20 mM $Fe(CN)_6^{3-}$, and 100 mM $KH_2PO_4$ in order to ensure that neither cathodic reactions nor non-faradaic current interfered with $I_{lim}$ measurements. The REM was initially operated with a permeate flux of 800 LMH, where both feed and permeate solutions were recycled for 30 min. After which, LSV was performed at J=110 to 950 LMH, in order to assess the effect of J on $k_{obs}$.

Oxyanion Separation

Nitrate separation experiments were conducted with 1 and 10 mM $NaNO_3$ solutions. Perchlorate separation experiments were performed with a 9 mM $NaClO_4$ solution. The REM was polarized as cathode and the stainless rod as anode. Cell potentials from 0 to 10 V were tested. The following equation was derived from the extended Nernst-Plank equation and was used to simulate $ClO_4^-$ and $NO_3^-$ concentrations in the permeate stream.

$$N_j = J_i C_{p,j} = -D_j \frac{\partial C_{f,j}}{\partial x} - \frac{z_j F}{RT} D_j C_{f,j} + C_{f,j} u \quad (5\text{-a})$$

where $N_j$ is the molar flux of species j (mol m$^{-2}$ s$^{-1}$); $J_i$ is the membrane permeate water flux (m s$^{-1}$) calculated at the inner membrane surface; $D_j$ is the diffusion coefficient (m$^2$ s$^{-1}$) (1.32×10$^{-9}$ for $NO_3^-$ and 1.7×10$^{-9}$ for $ClO_4^-$); $C_{p,j}$ and $C_{f,j}$ are the ion concentrations in the permeate and feed solutions, respectively (mol m$^{-3}$); $\Phi$ is the applied cell potential (V); u is the average solution velocity in the membrane pore entrance (m s$^{-1}$); R is the ideal gas constant (J mol-1 K-1); and T is the temperature (294 K). The porosity of the REM was $\theta$=0.304 (determined by Hg porosimetry analysis), which was applied to estimate u using equation:

$$u = \frac{J}{\theta} \quad (5\text{-b})$$

The flow conditions in the REM reactor allowed diffusion to be ignored (Pe=9.85×10$^5$), and the electric field is assumed to be linear between the anode and cathode. Therefore, equation (5) is simplified to the following:

$$C_{pj} = \frac{C_{fj} - \frac{z_j F}{RT} D_j C_{fj} \frac{\Phi}{L}}{Ji} \quad (5)$$

where $J_i$ is the membrane permeate water flux (m s$^{-1}$) calculated at the inner membrane surface; $D_j$ is the diffusion coefficient for species j (m$^2$ s$^{-1}$) (1.32×10$^{-9}$ for $NO_3^-$ and 1.7×10$^{-9}$ for $ClO_4^-$); $C_{p,j}$ and $C_{f,j}$ are the ion concentrations of species j in the permeate and feed solutions, respectively (mol m$^{-3}$); $\Phi$ is the applied cell potential (V); u is the average solution velocity in the membrane pore entrance (m s$^{-1}$); and L is the distance between the anode and cathode (1.7×10$^{-3}$ m).

Figure 5:
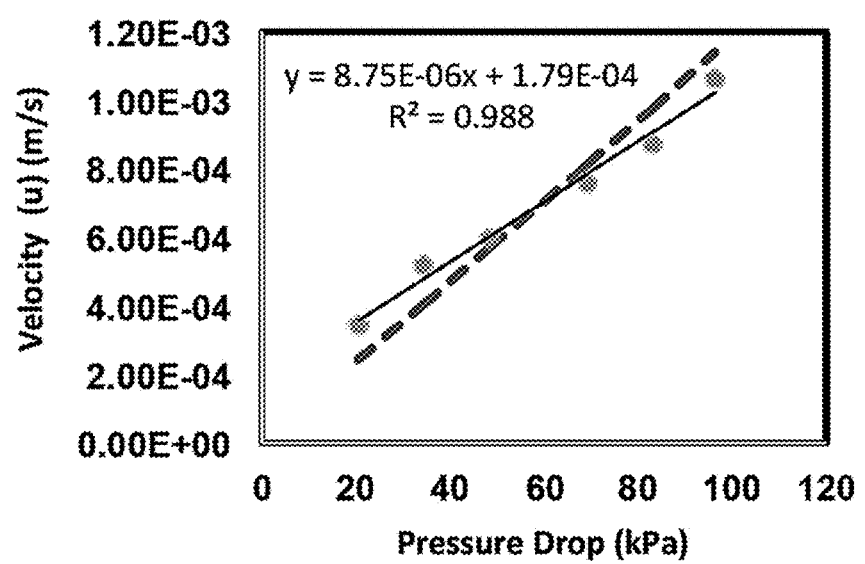
FIG. 5 shows comparison of experimental measurements of u versus the pressure drop across the membrane (light gray symbols) to equation (5) (dashed line). Solid line represents linear regression of the experimental data. T=21° C.

A plot of u versus trans-membrane pressure ($\Delta P$) for REM-3 shows the expected linear trend (FIG. 5). An independent estimate of u using the Hagen-Poiseuille equation was determined using equation:

$$u = \frac{r_p^2 \Delta P}{8\eta \Delta x} \quad (5\text{-c})$$

where $r_p$ is the pore radius; $\eta$ is the fluid viscosity (9.78× 10$^{-4}$ Pa s (21° C.)); and $\Delta x$ is the membrane thickness that $\Delta P$ is calculated over. Equation (5-d) is used to determine if the $\Delta P$ across the membrane is due to the hydraulic resistance of the support layer. For this calculation $\Delta x$=0.5 cm (entire membrane thickness) and $r_p$ was used to fit equation (5-d) to the u measurements (FIG. 5). A fitted value of $r_p$=1.52 µm was determined, which was nearly identical to the median pore radius of 1.49 µm determined by Hg porosimetry measurements. These results indicate that the $\Delta P$ across the membrane is due to the hydraulic resistance of the support layer, and that the effective pore size of the membrane can be determined from fitting $r_p$ to measured flux data.

The energy consumption was calculated based on measured potential and current at a range of J values, and the removal percentage was estimated with the corresponding permeate flux value using Nernst-Plank equation (5). A solution containing 1 mM $NO_3^-$ was prepared in 2 L DI water without the addition of a supporting electrolyte. Permeate fluxes of J=58, 290, 696, 1006 and 1296 LMH were tested. Under each J value, a linear sweep voltammetry scan was performed from 0 to 10 V. Energy consumption (EC) in kWh m$^{-3}$ was calculated using equation:

$$EC = 2.8 \times 10^{-7} \frac{VI}{Q} \tag{5-d}$$

where V is potential obtained by LSV (V); I is the corresponding current (A); Q is volumetric flow rate of permeate (m$^3$ s$^{-1}$); 2.8×10$^{-7}$ is a conversion factor (kW s W$^{-1}$ h$^{-1}$).

Reactivity Probes

There are two active mechanisms for compound oxidation at the REM, direct electron transfer and oxidation by hydroxyl radical. OA was chosen as a direct oxidation probe, as its reactivity with hydroxyl radical is low (1.4×10$^6$M$^{-1}$ s$^{-1}$). COU and TA were chosen as hydroxyl radical probes, as they have been reported to be resistant to direct oxidation and both readily react with hydroxyl radical to form fluorescent 7-HC and HTA products, respectively. The second-order rate constants for COU and TA with hydroxyl radical are 6.2×10$^9$M$^{-1}$ s$^{-1}$ and 4.0×10$^9$M$^{-1}$ s$^{-1}$, respectively.

Oxidation experiments with feed concentrations of OA (1 mM), COU (1 mM), and TA (0.1 mM) were prepared in a 2-L, electrochemically inert, 100 mM NaClO$_4$ supporting electrolyte solution. Before applying an electrode potential, feed and permeate solutions were recycled for 20-30 min through the REM to reach steady state and to assess compound adsorption. After which, an anodic potential was applied to the REM and the permeate solution was no longer recycled. For OA oxidation an anodic potential of 2.94 V was applied to the REM; for COU oxidation anodic potentials of 2.64 and 3.14 V were applied; and for TA oxidation anodic potentials of 2.14 and 2.64 V were applied. Current efficiency was calculated by:

$$CE = \frac{JFz(C_{pj} - C_{fj})}{I} * 100 \tag{6}$$

where J is the permeate flux rate on the outer membrane surface; z is the number of electrons transferred per molecule; I is the current density. All experiments were performed at room temperature (21±2° C.).

Analytical Methods

Concentrations of COU and TA were determined using HPLC with a C$_{18}$ (2) column (250×4.6 mm, Luna) and a photodiode array detector (wavelength=254 nm) (SPD-M30A, Shimadzu). HPLC with a fluorescent detector (RF-20A, Shimadzu) was used for 7-HC ($\lambda_{ex}$=332 nm and $\lambda_{em}$=471 nm) and HTA ($\lambda_{ex}$=315 nm and $\lambda_{em}$=435 nm) quantification. Concentrations of OA, NO$_3^-$, and ClO$_4^-$ were measured using ion chromatography (Dionex ICS-2100; Dionex IonPac AS16 Column). The pH was measured using a multi-function meter and probe (PC2700, Oakton).

Example 1

REMs were synthesized from a tubular 50 kDa TiO$_2$ ultrafiltration membrane (TAMI Industries; Les Laurons, France). The membrane was cut to 10 cm in length and had inner and outer diameters of 0.5 cm and 1.0 cm, respectively. The TiO$_2$ membrane was reduced to a Magnéli phase titanium suboxide (Ti$_n$O$_{2n-1}$) using a high temperature (1050° C.) reduction method under 1 atm H$_2$ gas in a tube furnace (OTF-1200X, MTI). Reductive treatments were performed for 30 hours to produce a Ti$_6$O$_{11}$ membrane (REM-1), 40 hours for a mixture of Ti$_4$O$_7$ and Ti$_6$O$_{11}$ (REM-2), and 50 hours for a Ti$_4$O$_7$ membrane (REM-3).

Physical Characterization.

Comparing the X-ray diffraction (XRD) data for the membranes to the standard data shows that the TiO$_2$ membrane was comprised of high purity TiO$_2$, and more reduced Magnéli phases developed with prolonged reduction times. The XRD data for the TiO$_2$, REM-1, REM-2, and REM-3 membranes are shown in FIGS. 1a, 1b, 1c, and 1d, respectively, and the XRD standards for Ti$_4$O$_7$, Ti$_6$O$_{11}$, and TiO$_2$ are shown in FIGS. 1e, 1f, and 1g, respectively. The XRD data for REM-1 (30 hour H$_2$ treatment) showed only the characteristic peak for Ti$_6$O$_{11}$ (22.84°) and peaks for other Magnéli phases were not observed. REM-2 (40 hour H$_2$ treatment) showed a decrease in the characteristic peak for Ti$_6$O$_{11}$, and the emergence of the characteristic peak for Ti$_4$O$_7$ (20.78°) (FIG. 1c). REM-3 (50 hour H$_2$ treatment) showed only the characteristic peak for Ti$_4$O$_7$ (FIG. 1d). The conductivity of the REMs increased in accordance with prolonged reduction time, and the conductivity increase agreed with the reported conductivity trend of the detected Magnéli phases. The TiO$_2$ membrane had a conductivity of 2.55×10$^{-5}$ S m$^{-1}$. The conductivity of REM-1, REM-2, and REM-3 were 56.6, 221, and 1132 S m$^{-1}$, respectively.

The scanning electron microscopy (SEM) image shown in FIG. 1h represents the cross-sectional structure of REM-3. The membrane consists of two Magnéli phase ceramic layers, the large pore support layer and small pore active filtration layer. The support layer is about 0.25 cm thick with 1 to 5 µm pores. The thickness of the support layer may be between 0.15 and 0.35 cm. The active layer is ~70 µm thick with <1 µm pores. The thickness of the active layer may be between 50 and 80 µm. The small pores of the active layer may lead to enhanced radial mass transport rates of aqueous compounds to the pore wall, and thus to increased reactivity. Additionally, the large pores of the support layer will reduce the pressure drop during filtration.

Figure 3:
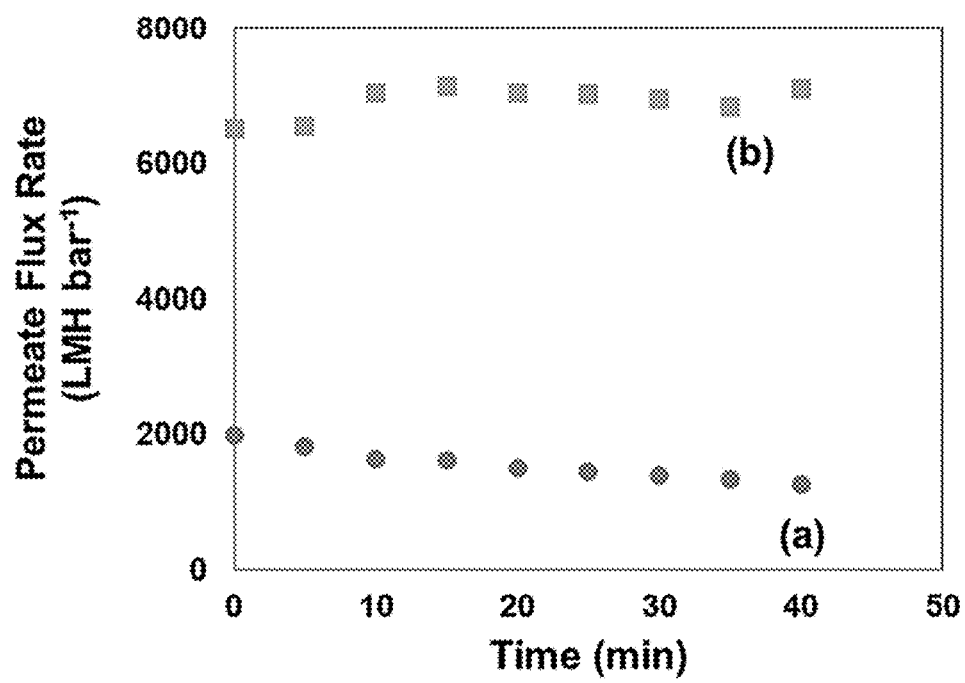
FIG. 3 shows pressure-normalized permeate membrane flux profiles for DI water at 21° C.: (a) $TiO_2$ membrane, and (b) REM-3. Flux rate was tested at $\Delta P=68.9$ kPa and 50 L h$^{-1}$ cross flow rate.

The pore structure of REM-3 and the TiO$_2$ membrane may be characterized by Hg porosimetry. Results are presented in FIG. 2. Porosimetry results for one embodiment of the TiO$_2$ membrane determined a porosity (θ) of 0.327, specific surface area of 0.820 m$^2$ g$^{-1}$, and median pore diameter of 3.67 µm (based on pore volume data). Porosimetry results for REM-3 (treated with high temperature H$_2$ for 50 hours) determined θ=0.304, specific surface area of 0.658 m$^2$ g$^{-1}$, and median pore diameter of 2.99 µm. These slight changes to the pore structure upon reduction to Ti$_4$O$_7$ were attributed to sintering of the nanopores (<10 nm), which is evident by comparing cumulative surface area versus pore diameter plots for the two membranes shown in FIGS. 2a and 2b. Characterization of the active layer pore structure by Hg porosimetry showed pore diameters of ~10 nm. In addition, the support layer had about 52-fold higher volume compared to the volume of the active layer. The sintering process resulted in a 3-fold increase in the permeate flux for REM-3 versus the TiO$_2$ membrane (FIG. 3), which is likely due to the elimination of the ~1.0 µm pores that were observed for TiO$_2$ but not for REM-3 (FIG. 2c-f).

Figure 4:
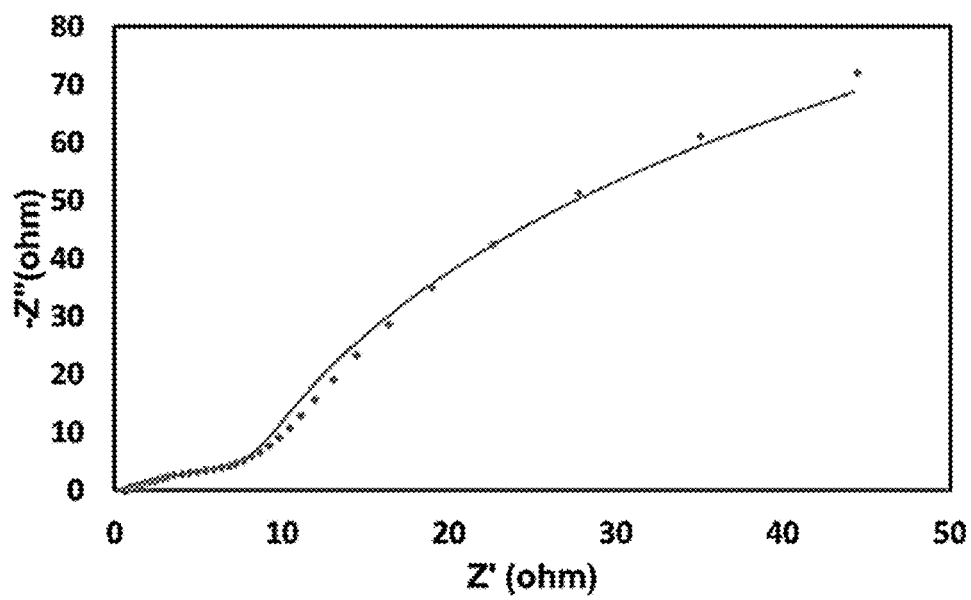
FIG. 4 shows measured electrochemical impedance spectroscopy (EIS) data for a solution of 5 mM $Fe(CN)_6^{4-}$ and 5 mM $Fe(CN)_6^{3-}$ in 100 mM $NaClO_4$ electrolyte collected at the OCP and T=21° C. Solid line is the TLM fit.

EIS measurements of REM-3 and the TLM model fit of the data are shown in FIG. 4. The total electro-active surface area estimate was 3.87×10$^{-1}$±1.79×10$^{-2}$ m$^2$, and was distributed as: 0.8±0.2% outer surface, 30.7±2.2% active layer, and 68.5±2.1% support layer. Thus, when the outer surface is not considered, the total electro-active surface area estimate may be distributed as 30.95±2.2% active layer, and 69.05±2.1% support layer. The total specific surface area as measured by Hg porosimetry was 2.90×10$^1$±1.34×10$^{-3}$ m$^2$ g$^{-1}$, indicating that ~4.4% of the total surface area was electroactive. This measurement is 3-fold higher than measured previously with a symmetric commercially available electrode (EBONEX®) that was configured as a REM. The roughness factor was 246.3±11.4 (based on inner surface area), and is in the range reported for porous gold electrodes measured by a similar EIS method. The roughness factor for REM-3 is 2.5-fold less than that previously reported for the symmetric EBONEX® REM (619±29). However, the specific surface area of the EBONEX® membrane was 4.2-fold higher than measured for REM-3, which is due to a higher nanopore surface area.

Reactivity Characterization.

Probe molecules were used to assess outer-sphere charge transfer ($Fe(CN)_6^{4-}$) and organic compound oxidation through both direct oxidation (oxalic acid) and formation of hydroxyl radicals (coumarin, terephthalic acid). In order to determine the limiting mechanism for compound oxidation during REM filtration experiments (mass transport versus kinetic limitation), the kinetics of $Fe(CN)_6^{4-}$ oxidation ($k_{obs}$) were measured as a function of permeate flux (J) using equation (4) (above). Previous work indicated that $k_{obs}$ was limited by convection at low fluxes (up to $2.8 \times 10^{-5}$ m s$^{-1}$, or 49.3 LMH bar$^{-1}$), and the measured $k_{obs}$ was equal to J. However, the very high J values (up to $9.2 \times 10^{-4}$ m s$^{-1}$, or 3208 LMH bar$^{-1}$) obtained with the REMs developed here were 33-fold (or 65-fold, if normalized by pressure) higher than those previously reported. The flux data shows that the REM developed in this disclosure had a large improvement in permeability at low trans-membrane pressures, which is a significant improvement compared to prior art. These very high membrane fluxes were controlled by the porous structure of the support (see FIG. 5) and resulted in plateauing of the $k_{obs}$ values (FIG. 6a), suggesting a kinetic limitation. The data for $k_{obs}$ versus J for all three REMs indicate that the more reduced Magnéli phases had higher $k_{obs}$ values for $Fe(CN)_6^{4-}$ oxidation. The plateau value for $k_{obs}$ increases in accordance with prolonged synthesis reduction times, with values for REM-1, REM-2 and REM-3 of $7.76 \times 10^{-5}$ m s$^{-1}$, $9.35 \times 10^{-5}$ m s$^{-1}$, and $1.69 \times 10^{-4}$ m s$^{-1}$, respectively.

Results in FIG. 6a were obtained at v=100 mV s$^{-1}$, where the charging current may contribute to the total current and cause an overestimation of $k_{obs}$. To measure $k_{obs}$ more precisely, another experiment with REM-3 was conducted at v=10 mV s$^{-1}$. The $k_{obs}$ value plateaued at around $1.4 \times 10^{-4}$ m s$^{-1}$, which is 17% lower than that obtained at v=100 mV s$^{-1}$ (FIG. 6b). FIG. 6b also includes a model fit (dark gray line) to the measured $k_{obs}$ values (equation (7)) that accounts for the competition between kinetics and mass transfer according to:

$$k_{obs} = \frac{k}{1 + \frac{k}{k_m}} \quad (7)$$

where $k_m$ is the mass transfer rate constant (m s$^{-1}$). The value for $k_m$ was set equal to J, which was deemed appropriate based on prior work that determined mass transfer was convection-limited in REMs where $k_{obs}$ values were much less than the pore diffusion rate constant.

The pore diffusion rate constant (10 can be estimated as $k_d = D/r$, where D is the diffusion coefficient (D=$1 \times 10^{-9}$ m$^2$ s$^{-1}$) and r is the median pore radius determined by Hg porosimetry (r=1.49 μm). These values provide an estimate of $k_d$=$6.7 \times 10^{-4}$ m s$^{-1}$, which is a conservative estimate given the active layer pore radius is much smaller. Nevertheless, the estimated $k_d$ value is 4.8-fold higher than the highest measured $k_{obs}$ value, and indicates that mass transfer was limited by convection and not pore diffusion. Thus the plateauing of the $k_{obs}$ data at high J values was related to kinetic limitations. Fitting equation (7) to the measured data yielded a value of k=$1.7 \times 10^{-4}$ m s$^{-1}$, which is assumed the kinetic limit. An independent estimate of k was calculated using equation (4), and a similar value ($1.64 \times 10^{-4}$ m s$^{-1}$) was determined. The highest value of the disclosure for $k_{obs}$ ($1.4 \times 10^{-4}$ m s$^{-1}$) is the highest reported in the literature for an electrochemical flow-through reactor and 5.4-fold larger than the highest value reported prior ($2.6 \times 10^{-5}$ m s$^{-1}$). These results are 40% higher than the highest rate constants reported for electrochemical carbon nanotube flow-through reactors ($1.7 \times 10^{-4}$ to $1.0 \times 10^{-4}$ m s$^{-1}$). Additionally, the $k_{obs}$ value reported here was obtained with ΔP=103 kPa versus 206 kPa used prior. These results indicate that the asymmetric REM-3 had superior mass transfer to the symmetric EBONEX® REM, which allowed the kinetic limit of the REM-3 to be realized.

Electrochemical Oxidation of Oxalic Acid (OA), which is Used as a Direct Oxidation Probe.

Figure 7:
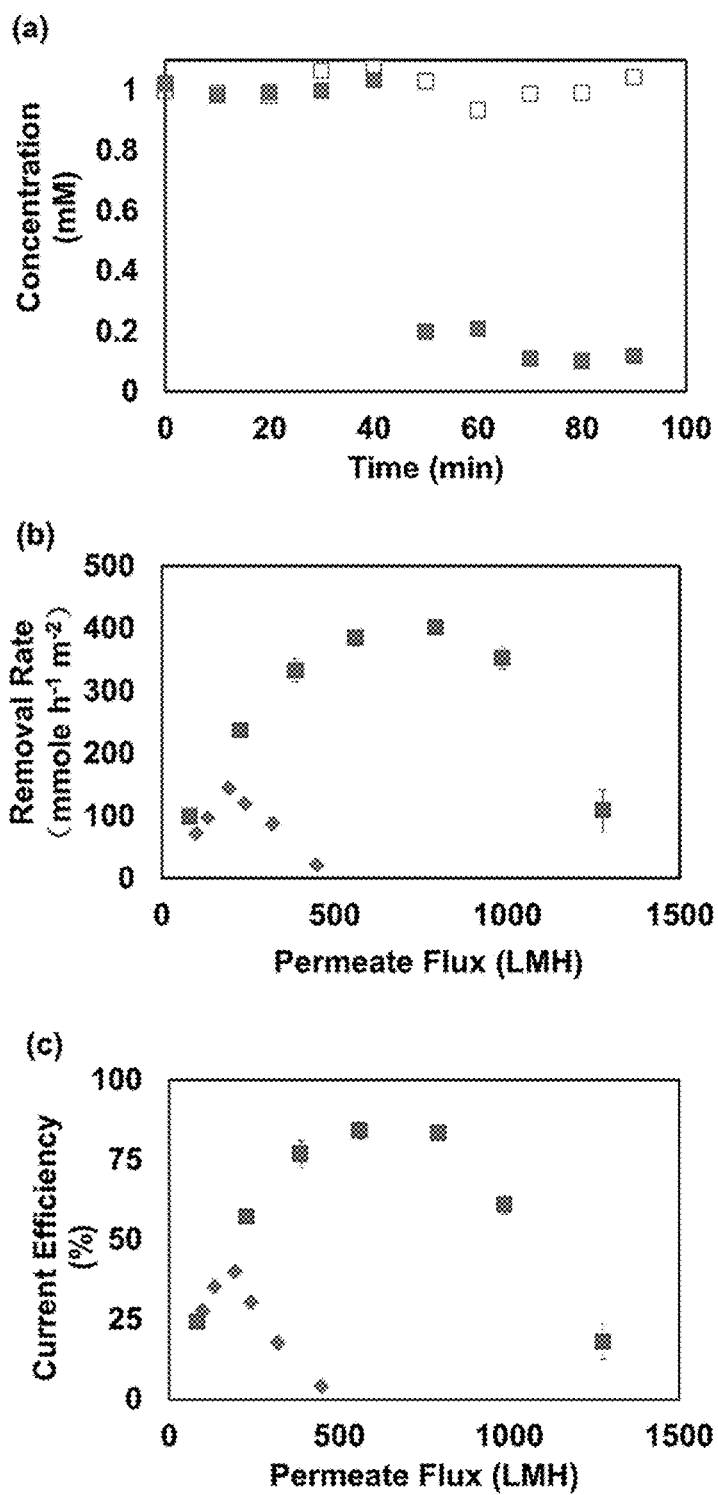
FIG. 7 shows results of electrochemical oxidation of oxalic acid (OA) studies. (a) Concentration profile of feed and permeate during OA oxidation on REM-3 at J=390 LMH. (b) Calculated removal rate of OA as a function of J. (c) Current efficiency of data in (b). REM-3 (squares) and REM-2 (diamonds). Experimental conditions: T=21° C.; Potential=2.94 V; Electrolyte=100 mM $NaClO_4$. Error bars represent 95% confidence intervals (n=4).

Experiments were conducted on REM-2 and REM-3 to determine the reactivity of OA as a function of the Magnéli phase. FIG. 7a shows an example of experimental results with REM-3 for OA oxidation at J=390 LMH. The first 40 minutes of the experiment was conducted at the OCP, and the similar concentrations in the feed and permeate indicate adsorption was not occurring. After an anodic potential (2.94 V) was applied (>40 min), an OA conversion of 85.3±4.0% in the permeate stream was achieved. FIG. 7b shows a summary of the OA experiments that includes the calculated OA removal rates as a function of J. The data clearly shows that the REM-3 was much more reactive than REM-2. The maximum OA removal was 401.5±18.1 mmole h$^{-1}$ m$^{-2}$ at 793 LMH for REM-3 and 177.3±6.02 mmole h$^{-1}$ m$^{-2}$ at 194 LMH for REM-2.

Figure 6:
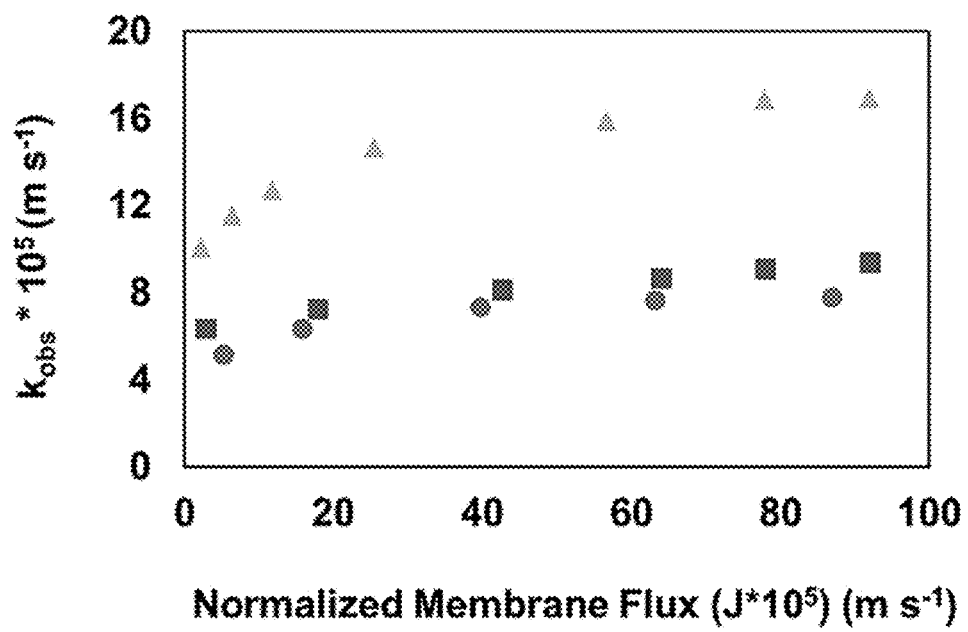
FIG. 6 shows plot of $k_{obs}$ as a function of J at T=21° C. for a solution of 5 mM $Fe(CN)_6^{4-/3-}$ and 100 mM $KH_2PO_4$. (a) REM-1 (circles), REM-2 (squares) and REM-3 (triangles) at v=100 mV s$^{-1}$. (b) Measured $k_{obs}$ for REM-3 at a scan rate of 10 mV s$^{-1}$ for a solution of 5 mM $Fe(CN)_6^{4-}$, 20 mM $Fe(CN)_6^{3-}$ and 100 mM $KH_2PO_4$. Solid dark gray line represent equation (7) model fit, and solid green line is convective mass transfer limit calculated by $k_{obs}$=J. (c) shows a plot of natural log of peak current versus peak potential. The dash line in (c) represents the linear fit of data points. The interception of the linear equation is used to estimate k according to equation (4). Error bars represent 95% confidence intervals and are contained within data points.
Figure 6:
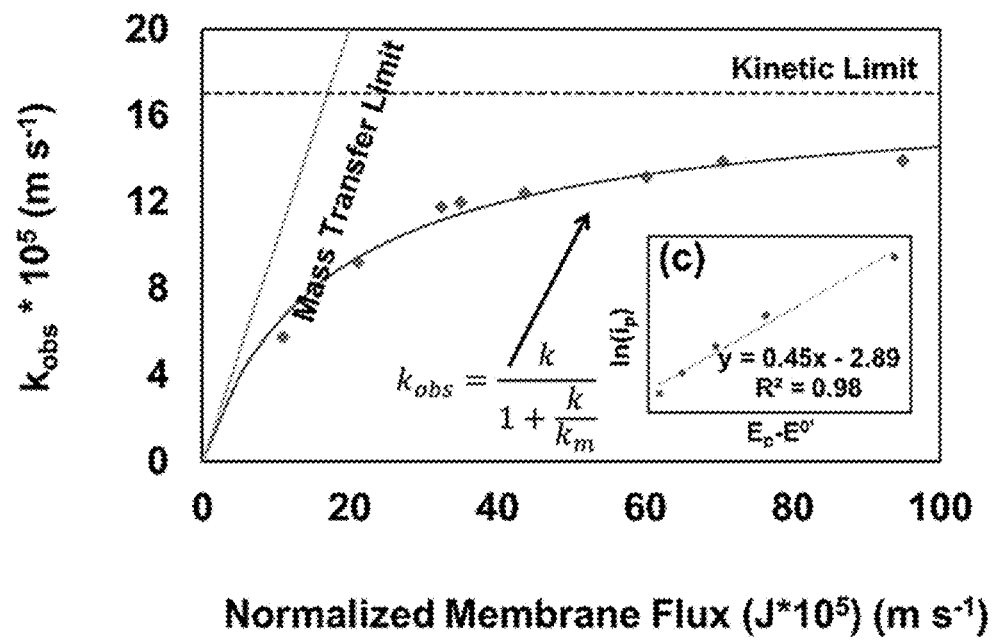
Figure 10:
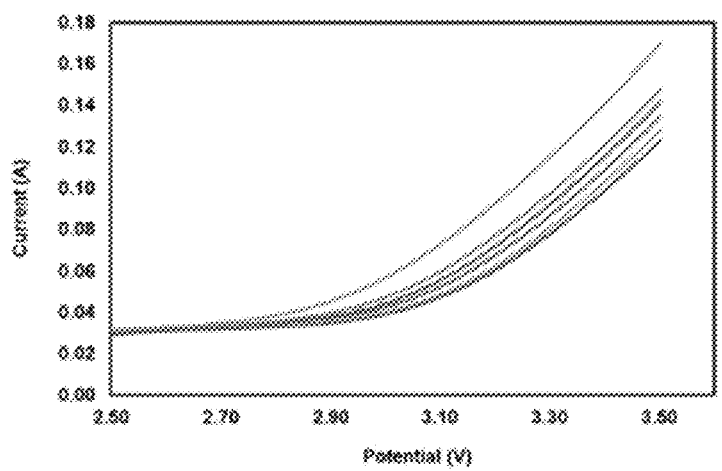
FIG. 10 shows polarization curves with 100 mM $NaClO_4$ and at T=21° C. From bottom to top, the curves represent polarization profiles for J=62, 193, 400, 561, 968, and 1243 LMH.

These J values were within the same range that $k_{obs}$ for $Fe(CN)_6^{4-/3-}$ oxidation was observed to plateau in FIGS. 6 and 6b. After the maximum OA reaction was reached, the rates decreased due to lower residence times in the REM, which suggest that the kinetic limit for OA was achieved. FIG. 7c shows the CE calculated by equation (6). The highest CE for REM-3 was between 84.1±2.7% and 83.4±0.9% at J=561-793 LMH and for REM-2 was 48.9±0.9% at J=194 LMH. The increase of CE at low fluxes was due to an increase in the convective mass transfer rate. Once OA removal was kinetically limited, the drop of CE at higher fluxes was due to competition from the oxygen evolution reaction. FIG. 10 shows polarization curves for oxygen evolution as a function of J. Higher J values increased the current for oxygen evolution. By sweeping gas bubbles from the REM surface. Previous work has shown a removal rate in the permeate of 390±26 mmole h$^{-1}$ m$^{-2}$ at 2.9 V and 74±10 LMH, and a current efficiency of only 59.3±3.9%. Once again, the superior flux properties of the REM-3 compared to the symmetric EBONEX® REM used in prior work results in a higher CE. Additionally, it was shown that $Ti_4O_7$ (REM-3) is more active for OA oxidation than the less reduced $Ti_6O_{11}$ Magnéli phase (REM-2). These results confirm reactivity of organic compounds via the direct oxidation mechanism.

Hydroxyl Radical Probe Studies.

To assess the production of hydroxyl radicals on the REM, COU and TA were used as hydroxyl radical probes. Separate control experiments were performed in a divided cell reactor, which confirmed COU and TA removal was due to anodic reactions (data not shown).

Figure 8:
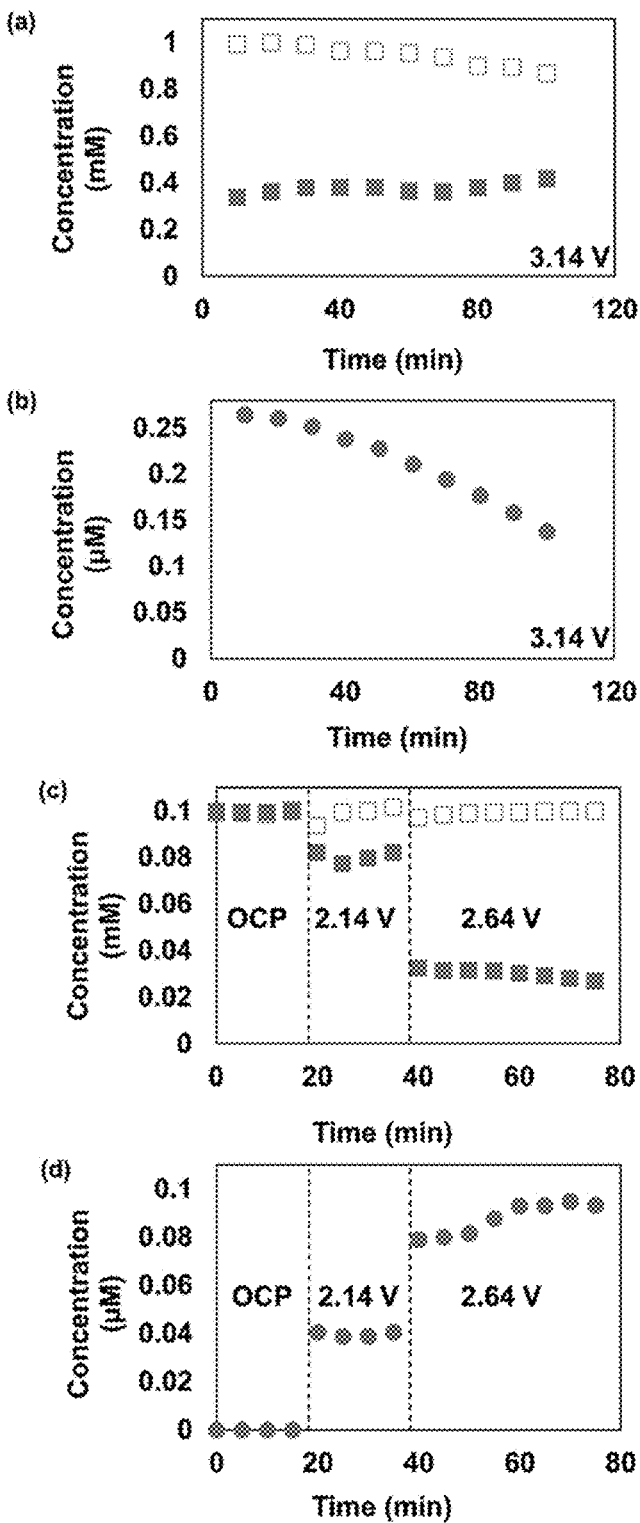
FIG. 8 shows results of hydroxyl radical probe studies. (a) Concentration profile of COU in the feed and permeate solutions of REM-3 (J=98 LMH). Anodic potential is 3.14V. (b) The generation of 7-HC during COU oxidation. (c) Concentration profile of TA in the feed and permeate solutions of REM-3. Anodic potential: OCP (0-20 min); 2.14 V (20-40 min); 2.64 V (>40 min); J=116 LMH. (d) Concentration of HTA during TA oxidation. All experiments were conducted in 100 mM $NaClO_4$ solution and T=21° C. Duplicate experiments are shown in (e)-(h), with J=132 LMH in (e) and J=110 LMH in (g).

Oxidation experiments with COU were conducted at the OCP, 2.64, and 3.14 V (J=98 LMH), and the formation of 7-HC was used as a qualitative hydroxyl radical probe. Results are summarized in FIG. 8 (with duplicate experiments provided in (e)-(h)). Removal of COU was only achieved at REM-3 (62.4±1.3%), and at an anodic potential of 3.14 V (FIG. 8a). COU removal was neither observed at the OCP nor at 2.64 V (data not shown). The formation of 7-HC was between 0.14 and 0.27 microM during the 3.14 V oxidation experiment (FIG. 8b), which indicates the existence of hydroxyl radical during the oxidation process. The low 7-HC yield is due to attack of hydroxyl radical at other positions of COU and the degradation of 7-HC to other products. The oxidation of COU and the generation of 7-HC on REM-3 and not REM-2 indicate that a high percentage of $Ti_4O_7$ in the anode is necessary for the hydroxyl radical production, and that $Ti_6O_{11}$ is not active for hydroxyl radical production. Ebonex® electrodes, which contain a low percentage of $Ti_4O_7$, are expected to have low yields of hydroxyl radicals.

TA was chosen as a second hydroxyl radical probe, as there are reports that COU is reactive on carbon electrodes, which are not known to form hydroxyl radicals. The experiments were performed with REM-3 at the OCP and anodic potentials of 2.14 and 2.64 V (J=116 LMH). Removal of TA was not observed at the OCP (0-20 min), was removed 18.7±2.0% in the permeate stream at an anodic potential of 2.14 V (20-40 min), and was removed 57.8±1.2% at an anodic potential of 2.64 V (>40 min) (FIG. 8c). FIG. 8d shows the detection of HTA in the permeate stream, which indicates that HTA concentrations approximately doubled upon raising the potential from 2.14 to 2.64 V. The yield of HTA was 0.03±0.03% at 2.14 V and 0.1±0.06% at 2.64 V. Reported hydroxyl radical generation potentials are above 2.2 V, and at potentials higher than 2.8 V significant concentrations of hydroxyl radicals form. These experimental results are consistent with the standard electrode potential for the hydroxyl radical generation half reaction ($H_2O \leftrightarrow OH\cdot + H^+ + e^-$) ($E_o$=2.38 V), and provide conclusive evidence for hydroxyl radical formation on the $Ti_4O_7$ anode (REM-3).

Electrochemical Separation of Oxyanions.

Figure 9:
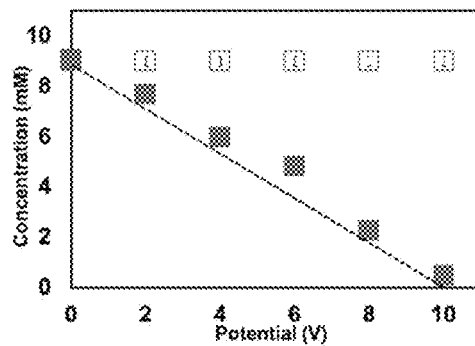
FIG. 9 shows concentration profiles of feed (hollow squares) and permeate (filled squares) during electro-separation of (a) 9 mM $ClO_4^-$ (J~109 LMH); (b) 10 mM $NO_3^-$ (J~170 LMH); and (d) 1.0 mM $NO_3^-$ (J~58 LMH) using REM-3. The feed and permeate solutions were 100% recycled. Cell potentials between 0 and 10 V were applied. Dash lines show the predicted concentration profile using the extended Nernst-Plank equation (5). (c) Calculated energy consumption of electro-separation of 1 mM $NO_3^-$ under different flow rates (from right to left were J=58, 290, 696, 1006, and 1296 LMH). Error bars represent 95% confidence intervals (n=3) and are contained within data points. T=21° C.
Figure 9:
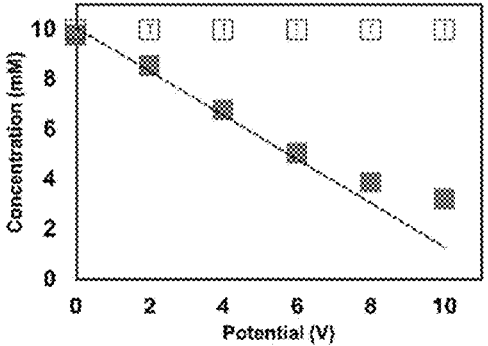
Figure 9:
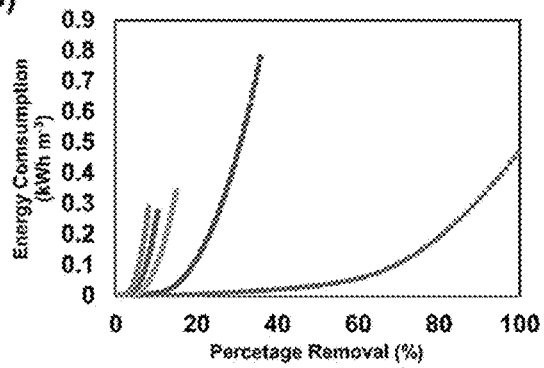
Figure 9:
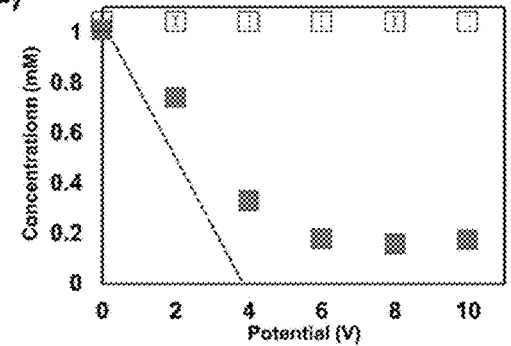

Experiments were also conducted to assess the ability of the REM-3 to reject both $ClO_4^-$ and $NO_3^-$ via electrostatic separation. For this experiment the REM was polarized as cathode and the stainless steel rod as anode. Feed concentrations of 9 mM $ClO_4^-$ and 10 mM $NO_3^-$ were tested. FIGS. 9a and 9b show the permeate concentrations of $ClO_4^-$ and $NO_3^-$, respectively, as a function of the cell voltage. Table 1 contains a summary of the experimental parameters and measurements. Cell potentials from 0 to 10 V in 2 V intervals were applied to the REM cell, which corresponded to electric fields up to 58.6 V cm$^{-1}$. When the applied cell potential increased, the concentration of $ClO_4^-$ or $NO_3^-$ in the permeate solution decreased. The predicted permeate concentrations of $ClO_4^-$ and $NO_3^-$ are represented in FIG. 9 by the dashed lines, which were calculated by the extended Nernst-Plank equation (5). The predicted permeate $ClO_4^-$ and $NO_3^-$ concentrations adequately match measured data, and indicate that oxyanion removal was due primarily to electrostatic repulsion. Evidence for electrochemical reduction was not found, as neither $NH_4^+$ nor reduced $ClO_x^-$ species were detected in solution.

Table 1 summarizes the data from the oxyanion filtration experiments, including an estimate of the energy consumption due to the applied cell potential. For $NO_3^-$ filtration experiments, removal ranged from 14.68±1.97% at 2 V cell potential to 68.02±0.60% at 10 V cell potential, and for $ClO_4^-$ filtration experiments removal ranged from 14.69±2.60% at 2 V cell potential to 95.10±1.08% at 10 V cell potential. The higher $ClO_4^-$ removal compared to $NO_3^-$ was attributed to a lower permeate flux, 109 LMH versus 170 LMH for $ClO_4^-$ and $NO_3^-$ experiments, respectively. The energy consumption increased with the cell potential, and was between 0.03 to 13.05 kWh m$^{-3}$ (0.021 to 1.92 kWh mol$^{-1}$) for $NO_3^-$ and between 0.04 to 19.12 kWh m$^{-3}$ (0.03 to 2.23 kWh mol$^{-1}$) for $ClO_4$.

TABLE 1

Summary of data for (a) nitrate (10 mM), (b) perchlorate (9 mM), and (c) nitrate (1 mM) separation experiments at 21° C.

| Cell Potential (V) | Cathodic Potential (V) | Anodic Potential (V) | Current (A) | pH | Energy (KWh m$^{-3}$) | Removal (%) | Predicted Removal (%) |
|---|---|---|---|---|---|---|---|
| (a) | | | | | | | |
| 0 | 0 | 0.00 | 0 | 5.33 | 0 | 0.0 | 0.0 |
| 2 | −0.5 | 1.40 | 0.008 | 5.15 | 0.03 | 14.68 ± 1.97 | 12.3 |
| 4 | −1.76 | 2.22 | 0.108 | 4.75 | 0.81 | 32.38 ± 1.93 | 24.0 |
| 3 | −2.98 | 2.92 | 0.264 | 4.53 | 2.80 | 49.61 ± 0.74 | 34.1 |
| 8 | −4.1 | 3.77 | 0.451 | 4.02 | 7.13 | 61.24 ± 1.29 | 50.8 |
| 10 | −5.2 | 4.61 | 0.681 | 3.73 | 13.05 | 68.02 ± 0.60 | 61.5 |
| (b) | | | | | | | |
| 0 | 0 | 0.00 | 0 | 5.73 | 0 | 0.0 | 0.0 |
| 2 | −0.46 | 1.50 | 0.006 | 5.52 | 0.04 | 14.69 ± 2.60 | 19.3 |
| 4 | −1.36 | 2.50 | 0.078 | 5.07 | 0.93 | 33.72 ± 2.46 | 38.6 |
| 3 | −1.9 | 3.90 | 0.234 | 4.65 | 4.18 | 46.66 ± 0.72 | 57.9 |
| 8 | −2.4 | 5.30 | 0.423 | 4.13 | 10.08 | 74.83 ± 2.57 | 77.2 |
| 10 | −4.2 | 5.80 | 0.642 | 3.88 | 19.12 | 95.10 ± 1.08 | 96.5 |
| (c) | | | | | | | |
| 0 | 0 | 0.00 | 0 | 5.82 | 0 | 0.0 | 0.0 |
| 2 | −0.55 | 1.31 | 0.001 | 5.15 | 0.01 | 26.73 ± 1.53 | 36.3 |
| 4 | −1.78 | 2.08 | 0.010 | 4.73 | 0.22 | 67.33 ± 1.93 | 72.6 |
| 3 | −2.77 | 3.09 | 0.030 | 4.41 | 0.87 | 82.18 ± 1.76 | 100.0 |
| 8 | −4.05 | 3.81 | 0.052 | 4.28 | 2.01 | 84.46 ± 0.55 | 100.0 |
| 10 | −5.5 | 4.36 | 0.085 | 4.10 | 4.08 | 82.67 ± 1.17 | 100.0 |

Figure 11:
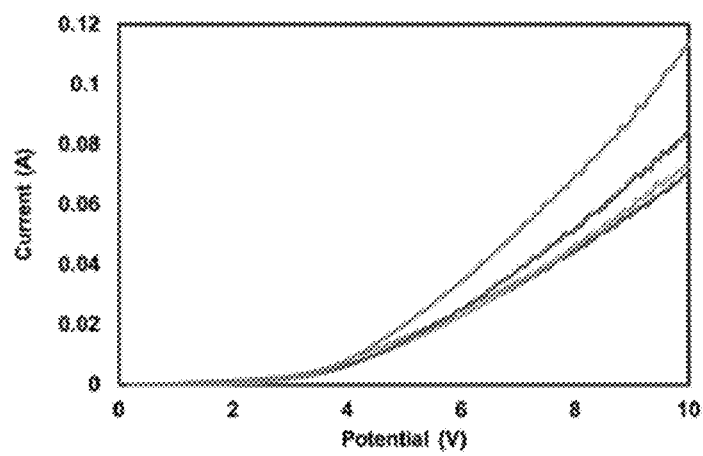
FIG. 11 shows polarization curves with 1 mM $NaNO_3$ at 21° C. From bottom to top, the curves represent polarization profiles for J=58, 290, 696, 1006, and 1296 LMH. (Curve for J=58 and 290 LMH overlap.)

These results indicate that the REM of the disclosure can be used for electrostatic ion separation. In order to determine more optimal conditions for $NO_3^-$ removal, polarization curves (FIG. 11) were performed with 1 mM $NaNO_3$ solutions, J values between 58 and 1291 LMH, and cell potentials between 2 and 10 V. Data from polarization curves were used in combination with equation (5) to determine energy consumption as a function of $NO_3^-$ removal at different J values (FIG. 9c). Calculations show that energy consumption increases drastically with increasing values of J, due to the high cell potential needed to counter-balance the convective flux. A value of J=58 LMH was chosen for further experimental study using a 1 mM $NaNO_3$ feed concentration, and permeate concentrations for $NO_3^-$ are shown in FIG. 9d. The decrease of the feed $NO_3^-$ concentration from 10 mM to 1 mM caused the conductivity of the electrolyte solution to drop by an order of magnitude, and therefore resulted in much lower current to flow at the same applied cell potential (Table 1). At a 4 V cell potential 67.33±1.93% of $NO_3^-$ was removed and energy consumption was 0.22 kWh $m^{-3}$ (0.33 kWh $mol^{-1}$), and at a 6 V cell potential 82.18±0.55% of $NO_3^-$ was removed and energy consumption was 0.87 kWh $m^{-3}$ (1.06 kWh $mol^{-1}$). Permeate concentrations did not reach zero at 8 V and 10 V cell potentials, as predicted by equation (5). This observation is attributed to faradaic water reduction reactions on the cathode at the relatively high cathodic potentials of −4.05 V and −5.50 V for 8 V and 10 V cell potentials, respectively. The pH of the recycled feed decreased in all experiments due to the generation of $H^+$ on the anode to balance $NO_3^-$ rejection and as a parasitic side reaction at high cell potentials.

Electrodialysis (ED) is an Effective and Mature Method for $NO_3^-$ Removal.

Reported energy consumption for ED ranges from 0.044 to 0.107 kWh $m^{-3}$ for the removal of 60 to 70% of a 1.27 mM $NO_3^-$ feed concentration, respectively.

There are several additional advantages of using the REM over ED related to mineral scaling, organic compound fouling, and chemical robustness. Mineral scaling is a concern for the ED process, as inorganics such as $Ca(OH)_2$ and $CaCO_3$ can form on the membrane and adversely affect membrane performance. Organic compound fouling is also problematic during ED, as they adsorb on the ion exchange membranes used in ED and cause a significant decrease in process performance, and membrane fouling is sometimes irreversible. Both scaling and irreversible organic compound fouling of ion exchange membranes used in ED can be regenerated with strong acid and base treatments, respectively, but significantly reduce the life of the polymeric membranes. However, the REM is made of a chemically resistant Magnéli phase material, and fouling and scaling can be eliminated by either reverse polarity treatment or chemical treatment (acid and base) without adverse effects to the membrane.

Bacteria Inactivation.

The REM may also be used for the disinfection of pathogens. In one example, a model *Escherichia coli* (*E. coli*) pathogen in chloride-free solutions was provided. The filtration system was operated in dead-end, outside-in filtration model, using the REM as anode and a stainless steel mesh as cathode. A 1-log removal of *E. coli* was achieved when the electrochemical cell was operated at the open circuit potential, due to a simple bacteria-sieving mechanism. At applied cell potentials of 1.3 and 3.5 V neither live nor dead *E. coli* cells were detected in the permeate stream (detection limit of 1.0 cell $mL^{-1}$), which was attributed to enhanced electrostatic bacteria adsorption at the REM anode. Bacteria disinfection in the retentate solution increased as a function of the applied cell potential, which was attributed to a convection-enhanced transport of *E. coli* to the REM surface, and direct contact with the local acidic environment produced by water oxidation. The low energy requirement of the process (2.0 to 88 mW hr $L^{-1}$) makes the REM of the disclosure suitable for portable water disinfection.

Example 2

REMs were synthesized from a tubular 50 kDa $TiO_2$ ultrafiltration membrane (TAMI Industries; Les Laurons, France) as provided in Example 1.

Physical Characterization. The dual pore structure of the REM-4 is shown in SEM images presented in FIG. 12 (a-c). The visual pore diameter of the top active layer is between 0.1 and 1 μm and the active layer is ~60 μm in thickness, while the support layer has a pore size ten times larger than the active layer and makes up the remainder of the membrane. Both active and support layers were converted to substoichiometric $TiO_2$ Magnéli phases, as determined by XRD (FIG. 12d). The characteristic peaks for $Ti_4O_7$ and $Ti_6O_{11}$ are located at 2 theta angles of 20.78° and 22.84°, respectively. The existence of peaks at these two positions indicates that the substoichiometric $TiO_2$ membrane consists primarily of $Ti_4O_7$ and $Ti_6O_{11}$. Peaks characteristic of $TiO_2$ were not present, which indicates a full conversion from $TiO_2$ to the Magnéli phases was accomplished.

The pore structure of the REM-4 was characterized by Hg porosimetry, which is shown in FIGS. 12e and 12f. The REM-4 exhibits a bimodal pore size distribution with surface area of 0.117 $m^2$ $g^{-1}$ associated with support layer (pores >1 μm) and that of 0.03 $m^2$ $g^{-1}$ associated with the active layer (pore size between 1 μm and 0.01 μm) (FIG. 12e). Nearly the entire pore volume is dominated by the support layer, which contains pores of 1 to 3.8 μm diameters (FIG. 12f). Porosimetry results determined a porosity of 28.20%, specific surface area of 0.94 $m^2$ $g^{-1}$, and median pore diameter of 3.27 μm (based on pore volume), which represents the pore size in the support layer. Total surface area of the REM-4 used in filtration experiments was 16.90 $m^2$.

The total $A_{electro}$ determined by EIS was 1.92±0.06 $m^2$. The $A_{electro,outer}$ was 0.09±0.007 $m^2$, and the $A_{electro}$ of the active layer and the support layer were 0.35±0.02 $m^2$ and 1.49±0.03 $m^2$, respectively. Using the 17.2 $cm^2$ nominal geometric inside surface area of the REM-4, the average roughness factor was 344.47±1.04. The $A_{electro}$ per gram of the REM is 0.11±0.003 $m^2$ $g^{-1}$, which indicates that only about 11.37% of specific surface area determined by Hg porosimetry was electroactive. Assuming that the total surface area is accessible by the solvent and therefore can be measured by EIS, the REM-4 is electro-active over an ~256 μm depth. Assuming that only the REM-4 micropores are electro-active, than the total electro-active area is about 50.22%, which yields a 1.13 mm electro-active depth. The true electro-active depth is between these two extremes (256 μm-1.13 mm).

A transmission line model (TLM) was developed and successfully applied to the asymmetric ultrafiltration membrane to detect membrane fouling at the outer membrane surface and active and support layers. Two model foulants, humic acid and polystyrene microspheres, were used for this investigation. Based on the information obtained from EIS on membrane fouling, a new chemical free electrochemical regeneration (CFER) scheme was developed that utilized electrochemical regeneration in backwash mode, and was able to fully recover a fouled membrane without chemical reagent addition. The REM-4 also proved to be durable and stable in a long-term experiment consisting of 5 consecutive fouling/regeneration cycles. The power consumption during the non-optimized membrane regeneration procedure was low, at only 0.61 kWh m$^{-1}$ (geometric surface area) for anodic CFER of both humic acid fouled and polystyrene microsphere fouled REMs with backwash and 0.39 kWh m$^{-1}$ for cathodic CFER of polystyrene microsphere fouled REM with backwash. The advantage of an electrochemical regeneration scheme is the elimination of traditional membrane cleaning using chemical reagents, which is not only cost effective and time efficient, but also environmentally friendly. Thus, the REM of the disclosure offers numerous practical benefits when used in various water treatment applications.

Fouling Regeneration.

The REM may be used for electrochemical regeneration of membranes fouled by dissolved compounds and particulates. In one example, humic acid (HA) was used as a representative dissolved organic compound foulant and polystyrene beads (PS) were used as a representative particulate foulant. A chemical free electrochemical regeneration (CFER) scheme in backwash mode was developed as shown in FIG. 13b. The CFER in anodic treatment mode recovered the flux of a HA fouled REM from 3% to between 76% and 99% of the initial flux over 5 continuous fouling/regeneration cycles. Full flux recover of a PS fouled REM (fouling 31% to 38%) was achieved when using either cathodic or anodic CFER. By contrast, regeneration without an applied potential showed only partial flux recovery of 66% and 62% on HA fouled and PS fouled membranes, respectively. The operating cost of CFER was $0.04 m' to $0.06 m' per regeneration cycle, which is only 1.3% the cost of NaOH cleaning. Thus, the REM of the disclosure may provide efficient and cost effective devices in water treatment applications.

This Example is described in further detail in Yin Jing et al. (2016) "Electrochemical impedance spectroscopy study of membrane fouling and electrochemical regeneration at a sub-stoichiometric TiO$_2$ reactive electrochemical membrane," *Journal of Membrane Science*, 510:510-523, which is hereby incorporated by reference herein in its entirety for all purposes.

Example 3

Pressed Pellet Reactive Electrochemical Membrane.

The TiO$_2$ powder (32 nm) was reduced to a Magnéli phase titanium suboxide (Ti$_n$O$_{2n-1}$) in the presence of 1.0 atm flowing H$_2$ at a temperature of 1050° C. for 5 hours in a tube furnace. The support layer of the membrane was prepared by mixing 0.5 g of Ti$_4$O$_7$ powder with 2-3 wt % of paraffin oil as binder. The mixture was placed in a 1.12 cm diameter die and a pressure of about 690 bar was applied using a hydraulic press, which gave a pellet thickness of about 2.0 mm. The active layer was deposited by drop casting a 50 µL volume of 1.0 wt % Ti$_4$O$_7$ powder dispersed in 10 mL methanol and air dried. The membrane was again reduced in the presence of H$_2$ gas at 1050° C. for about 6 h in a tube furnace for the removal of the binder as well as sintering.

SEM analysis of the pressed powder REM showed two ceramic layers in the cross sectional image. The support layer is about 0.25 cm and the active layer is ~74 µm thick with Ti$_4$O$_7$ particles that are approximately micron size. Additionally, the pore structure of REM was characterized by Hg porosimetry. Porosimetry results measured a porosity (θ) of 0.477, specific surface area of 4.40 m$^2$ g$^{-1}$, and median pore diameter of 0.89 µm (based on pore volume data).

Example 4

Gel Cast Reactive Electrochemical Membrane.

The gel cast membrane was synthesized using 50 wt % TiO$_2$ powder, which was dispersed in 0.5 wt % polyacrylic acid and allowed to mix for 1 h. A 4:1 ratio of monomer (methacrylamide) to cross-linker (methylenebisacrylamide) was added to this slurry. Next, an aqueous solution of 0.01 wt % ammonium persulfate was added to the slurry and allowed to mix for 6 hours. The polymerization reaction was catalyzed by adding tetramethylethylenediamine drop wise to the slurry and quickly mixing with a glass rod for 1 min before pouring the slurry into molds. Polymerization would take place in about 5 minutes and the casted pellets, referred to as green bodies, were dried at 50° C. for approximately 12 hours in an oven. After drying, the green body pellets were sintered in flowing air at 1050° C. for 6 hours, and then reduced to Ti$_4$O$_7$ in flowing H$_2$ at 1050° C. for an additional 6 hours in a tube furnace.

The pore structure of the gel cast REM was characterized by Hg porosimetry. Porosimetry results measured a porosity (0) of 0.21, specific surface area of 2.70 m$^2$ g$^{-1}$, and median pore diameter of 1.82 µm (based on pore volume data).

Example 5

Membrane Etching.

A wet chemical etching process was used to increase the electroactive surface area of the REM. The etchant solutions contain mixtures of 50 wt % H$_3$PO$_4$ and 10 wt % H$_2$O$_2$ (to dissolve the oxide) in water. The prepared etchant solution temperature was maintained at 80° C. using an oil bath. The REM was immersed in the solution for 30 min then rinsed with DI water. After electrochemical characterization of the pellet, it was further etched for 60 min followed again by electrochemical characterization.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A reactive electrochemical membrane comprising
   a support layer having a median pore diameter size of 1 µm to 10 µm; and
   an active layer disposed adjacent to and in contact with the support layer, and having a median pore diameter size of less than 1 µm,
   wherein the median pore diameter of the support layer is at least 50% bigger than the median pore diameter of the active layer, and
   wherein the support layer and the active layer independently comprise at least 80 wt % oxides of titanium, and wherein the oxides of titanium comprise at least 80 wt % of one or more of Magnéli-phase titanium oxides of the formula Ti$_n$O$_{2n-1}$, wherein n is an integer 4, 5, or 6.

2. The reactive electrochemical membrane of claim 1, wherein the support layer and the active layer independently comprise at least 95 wt % oxides of titanium.

3. The reactive electrochemical membrane of claim 1, wherein the oxides of titanium comprise at least 90 wt % of one or more of Magnéli-phase titanium oxides of the formula $Ti_nO_{2n-1}$.

4. The reactive electrochemical membrane of claim 3, wherein n is 4.

5. The reactive electrochemical membrane of claim 1, wherein each of the support layer and the active layer comprises of $Ti_4O_7$.

6. The reactive electrochemical membrane of claim 1, wherein each of the support layer and the active layer consists of a mixture of $Ti_4O_7$ and $Ti_6O_{11}$.

7. The reactive electrochemical membrane of claim 1, wherein the active layer has a median pore diameter size of 10 nm to 1 μm.

8. The reactive electrochemical membrane of claim 1, wherein the active layer has a thickness of 10 μm to 100 μm.

9. The reactive electrochemical membrane of claim 1, wherein the support layer has a thickness of 50 μm to 5 mm.

10. The reactive electrochemical membrane of claim 1 having a roughness factor of at least 300 (determined based on inner surface area).

11. The reactive electrochemical membrane of claim 1 having a pressure-normalized permeate membrane flux for deionized water between 100 and 8000 L $m^{-2}$ $hr^{-1}$ $bar^{-1}$, as measured at temperature of 21° C., a cross flow rate of 50 L $h^{-1}$, and trans-membrane pressure of 68.9 kPa.

12. A method of preparing the reactive electrochemical membrane of claim 1, comprising heating a $TiO_2$ membrane under a $H_2$ atmosphere to a temperature of 800 to 1500° C.

13. The method of claim 12, wherein $H_2$ atmosphere is maintained at a pressure of 0.5 atm to 1.5 atm.

14. The method of claim 12, wherein the $TiO_2$ membrane is an asymmetric $TiO_2$ ultrafiltration membrane.

15. A method of purification and filtration of water comprising
 (a) providing a reactor comprising a voltage source having a first terminal and a second terminal, a counter electrode being connected to the first terminal, and the reactive electrochemical membrane of claim 1 being connected to the second terminal,
 (b) passing contaminated water through the reactive electrochemical membrane such that the contaminated water is in contact with the counter electrode while applying a voltage between the counter electrode and the reactive electrochemical membrane using the voltage source to remove contaminants; and
 (c) removing purified and filtered water from the reactor.

16. The method of claim 15, wherein the pressure drop across the reactive electrochemical membrane during passing of the contaminated water is less than 2 bar.

17. The method of claim 15, further comprising electrochemically degrading the contaminants during passing of the contaminated water through the reactor comprising the reactive electrochemical membrane.

18. The method of claim 15, further comprising submitting the reactive electrochemical membrane to anodic or cathodic electrochemical regeneration after removing the purified and filtered water from the reactor.

19. The method of claim 15, wherein one or more of contaminants is bacterial or viral pathogen.

20. The method of claim 15, wherein one or more of contaminants is oxyanions.

* * * * *

UNITED STATES PATENT AND TRADEMARK OFFICE
CERTIFICATE OF CORRECTION

PATENT NO. : 10,364,169 B2
APPLICATION NO. : 15/365252
DATED : July 30, 2019
INVENTOR(S) : Chaplin et al.

Page 1 of 1

It is certified that error appears in the above-identified patent and that said Letters Patent is hereby corrected as shown below:

In the Specification

Column 1, Lines 15-18 should be replaced with the following text:
-- This invention was made with government support under grant nos. 1453081 and 1356031 awarded by the National Science Foundation. The government has certain rights in this invention. --

Signed and Sealed this
First Day of October, 2019

Andrei Iancu
*Director of the United States Patent and Trademark Office*